United States Patent
Hwang

(10) Patent No.: US 9,678,648 B2
(45) Date of Patent: Jun. 13, 2017

(54) MOBILE TERMINAL AND CONTROLLING METHOD THEREOF

(71) Applicant: LG ELECTRONICS INC., Seoul (KR)

(72) Inventor: Myunghee Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 14/292,027

(22) Filed: May 30, 2014

(65) Prior Publication Data

US 2014/0359443 A1 Dec. 4, 2014

(30) Foreign Application Priority Data

May 31, 2013 (KR) .................... 10-2013-0062834

(51) Int. Cl.
*G06F 3/0485* (2013.01)
*H04M 1/725* (2006.01)

(52) U.S. Cl.
CPC ...... *G06F 3/0485* (2013.01); *H04M 1/72519* (2013.01); *G06F 2203/04804* (2013.01); *H04M 2250/22* (2013.01)

(58) Field of Classification Search
CPC .............................. G06F 3/0484; G06F 3/0481
See application file for complete search history.

(56) References Cited

U.S. PATENT DOCUMENTS

| | | | |
|---|---|---|---|
| 6,118,427 A | 9/2000 | Buston et al. | |
| 6,476,831 B1* | 11/2002 | Wirth | G06F 3/0485 345/588 |
| 8,495,514 B1* | 7/2013 | Ludolph | G06F 3/0481 715/768 |
| 2006/0139325 A1* | 6/2006 | Wang | G06F 1/1626 345/158 |
| 2007/0081798 A1* | 4/2007 | Peng | G11B 27/105 386/241 |
| 2009/0097820 A1* | 4/2009 | Furuyama | H04N 21/47214 386/299 |
| 2009/0158191 A1* | 6/2009 | Varanda | G06F 3/0481 715/773 |
| 2009/0210820 A1* | 8/2009 | Adachi | G06F 3/0481 715/786 |
| 2010/0153544 A1 | 6/2010 | Krassner et al. | |

(Continued)

FOREIGN PATENT DOCUMENTS

| | | |
|---|---|---|
| EP | 2784653 A2 | 10/2014 |
| WO | WO 01/43431 A2 | 6/2001 |
| WO | WO 2012/164965 A1 | 12/2012 |

*Primary Examiner* — David Choi
(74) *Attorney, Agent, or Firm* — Birch, Stewart, Kolasch & Birch, LLP

(57) ABSTRACT

A mobile terminal and controlling method thereof are disclosed, by which transparency and output location of a video can be automatically adjusted. In performing multitasking for processing an additional task while playing a video, the present invention includes displaying a play window for outputting the video by overlaying the play window on a task window for processing the additional task, receiving a user input for scrolling the task window, and automatically adjusting at least one of a transparency of the play window and a display location of the play window while scrolling the task window in response to the user input.

16 Claims, 21 Drawing Sheets

(56) References Cited

U.S. PATENT DOCUMENTS

| | | | |
|---|---|---|---|
| 2011/0083099 A1* | 4/2011 | Eun | G06F 3/0485 715/786 |
| 2012/0179967 A1 | 7/2012 | Hayes | |
| 2012/0254781 A1* | 10/2012 | Larsen | G06F 3/0481 715/765 |
| 2013/0167069 A1* | 6/2013 | Abe | G06F 3/0485 715/784 |
| 2013/0222435 A1* | 8/2013 | Choi | G06F 3/0482 345/684 |
| 2013/0283205 A1* | 10/2013 | Suzuno | G01C 21/367 715/784 |
| 2013/0332960 A1* | 12/2013 | Young | H04N 21/2743 725/41 |
| 2014/0304644 A1* | 10/2014 | Pereira | G06F 3/0485 715/784 |
| 2014/0359443 A1* | 12/2014 | Hwang | G06F 3/0485 715/716 |

* cited by examiner

FIG. 7
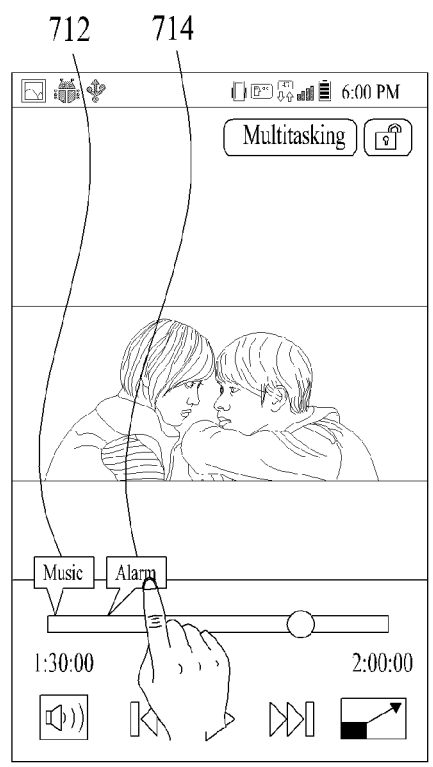
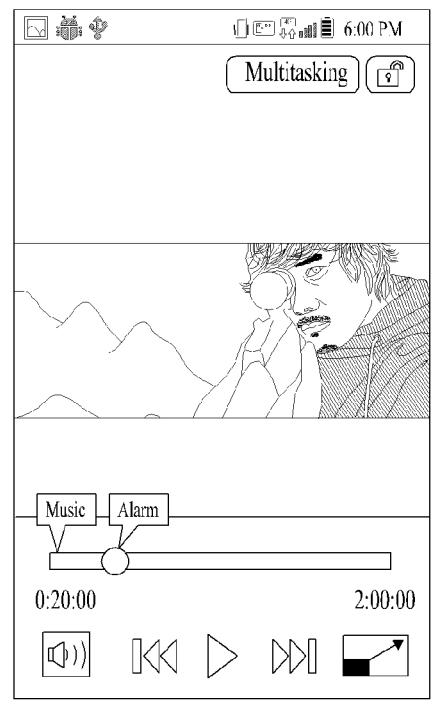
(a)  (b)

FIG. 8
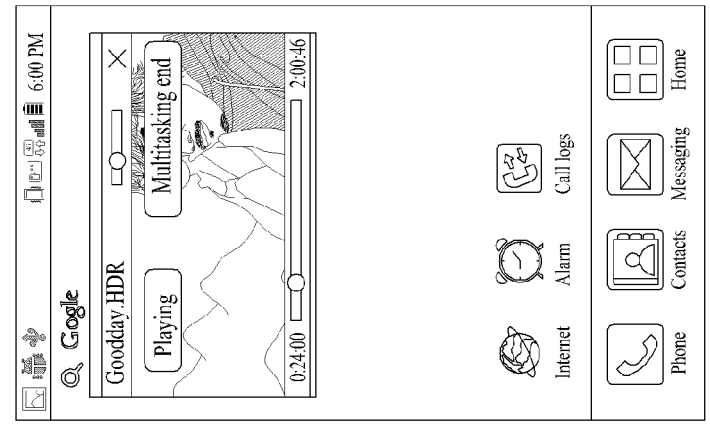
(c)
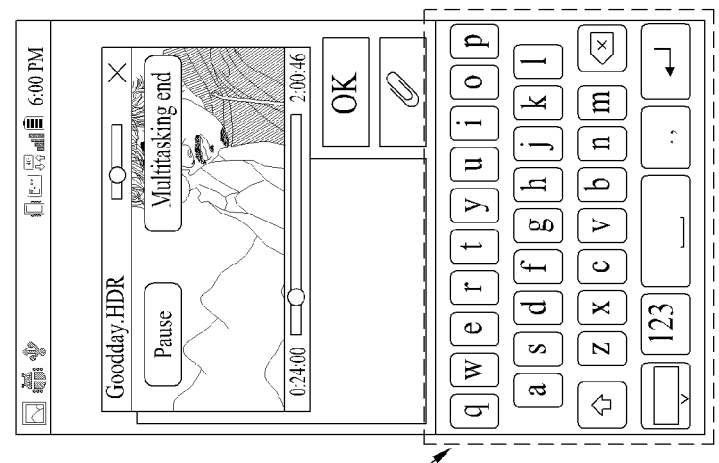
(b)
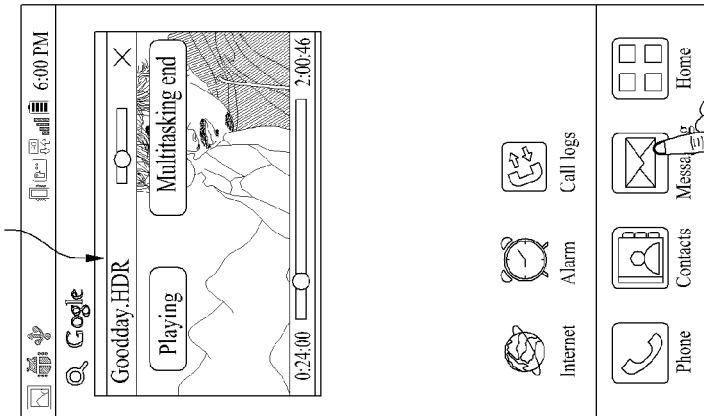
(a)

FIG. 10
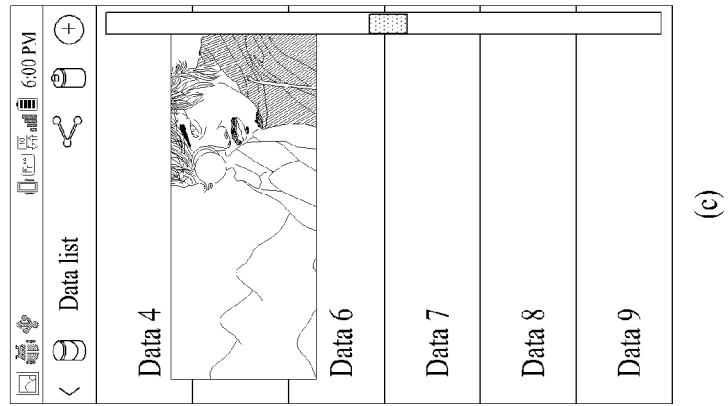
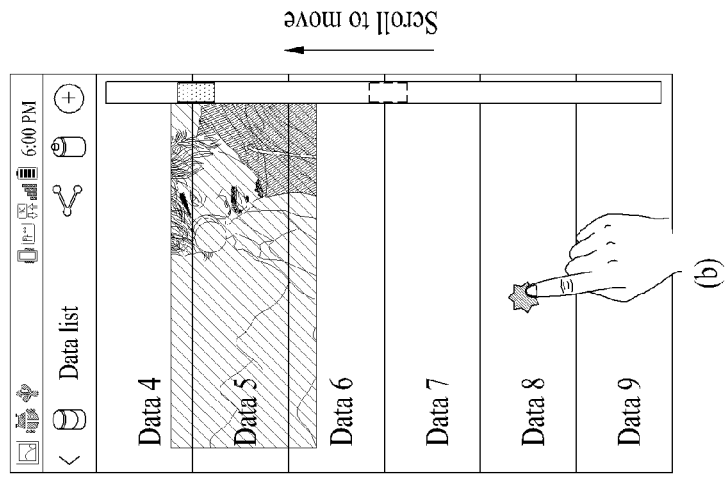
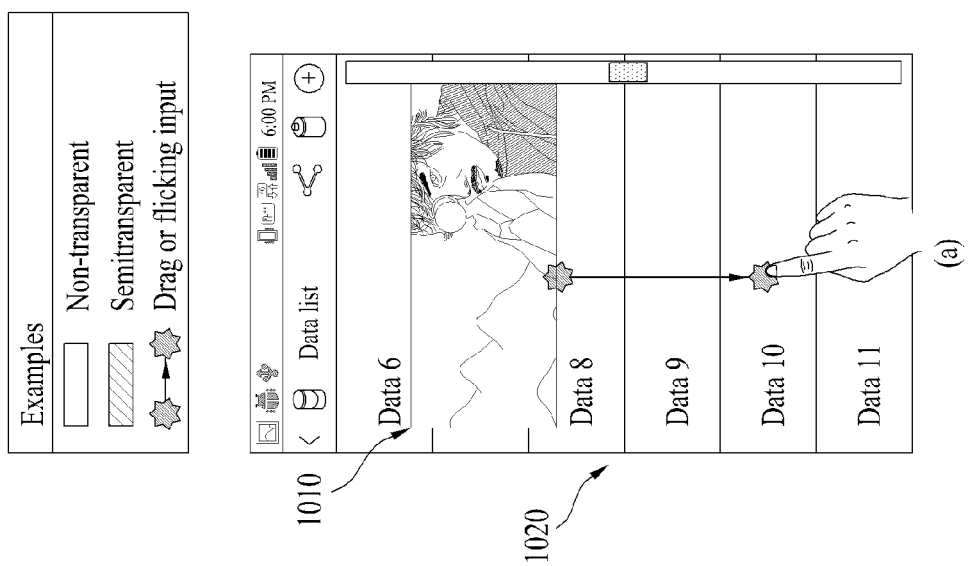

FIG. 11
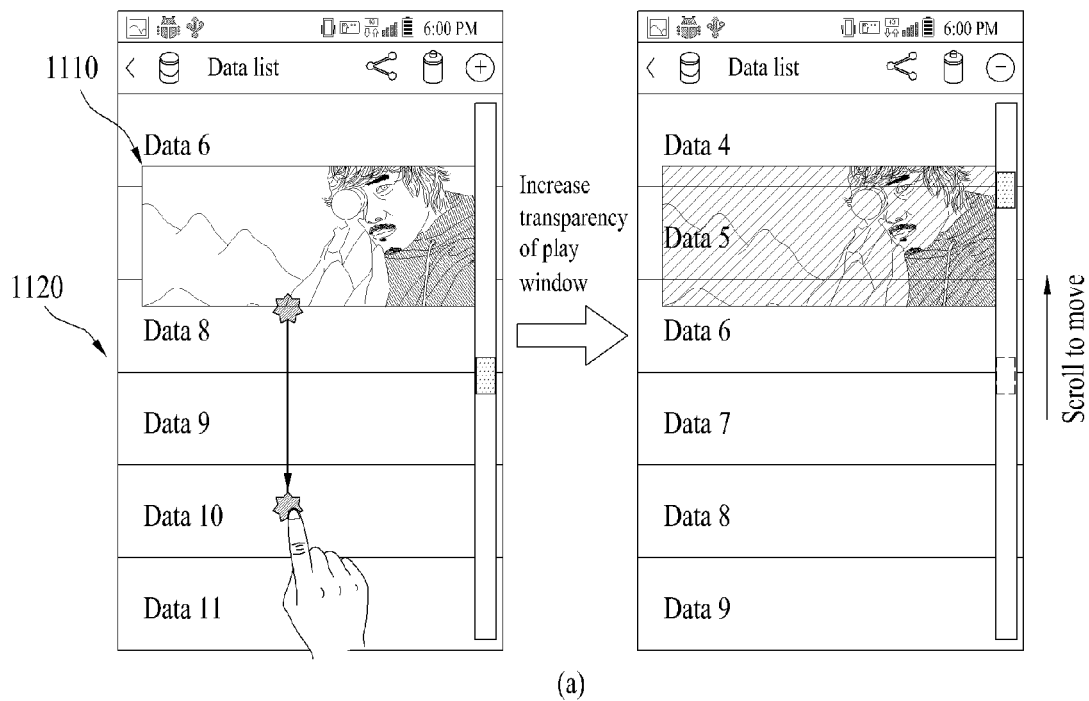
(a)
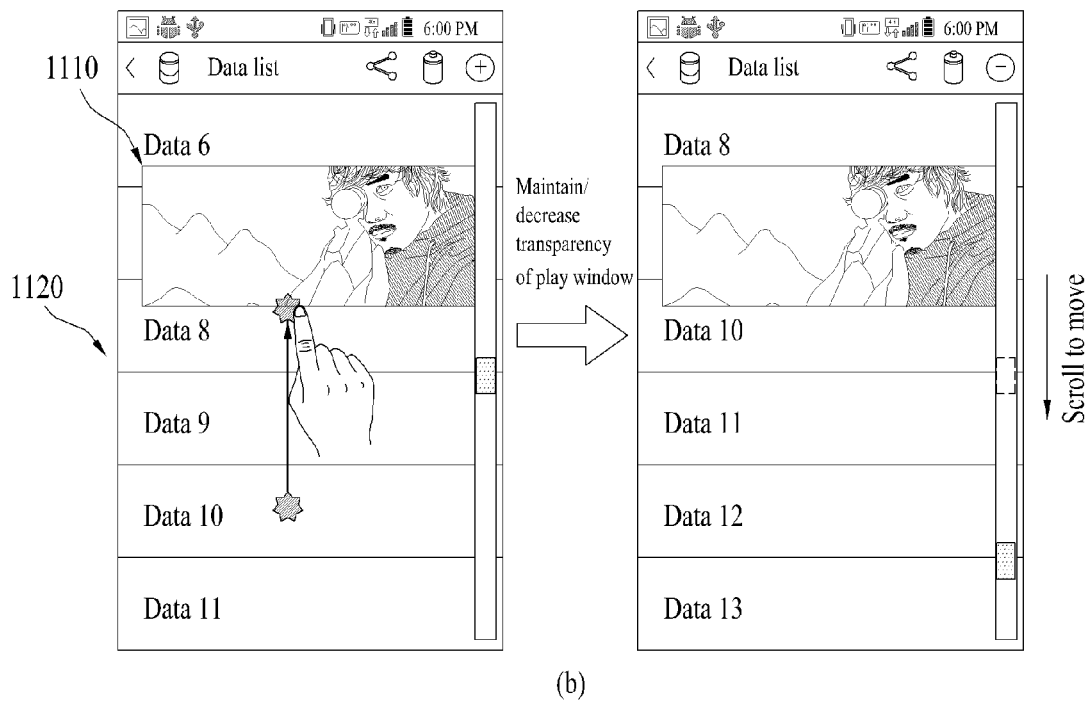
(b)

FIG. 12
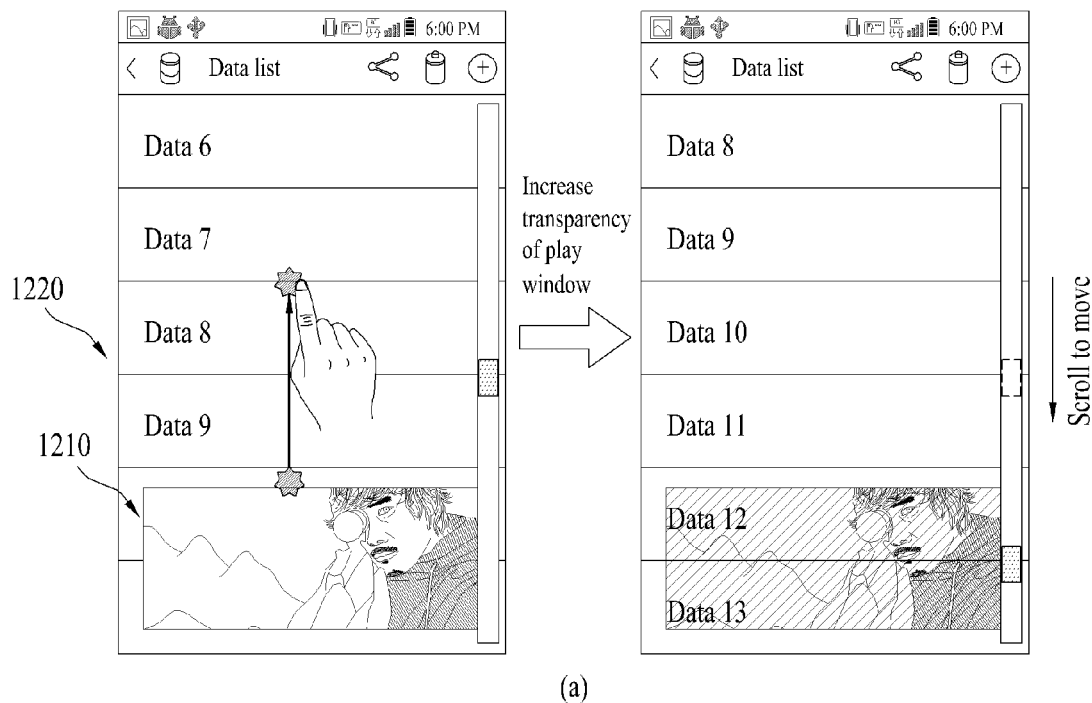
(a)
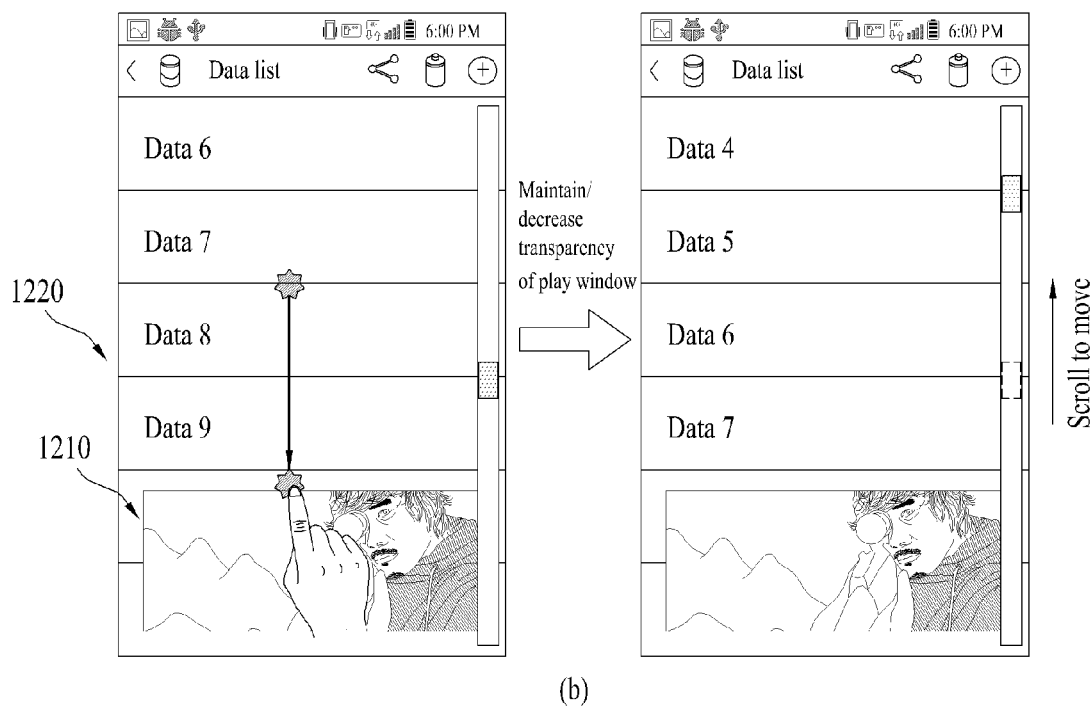
(b)

FIG. 13
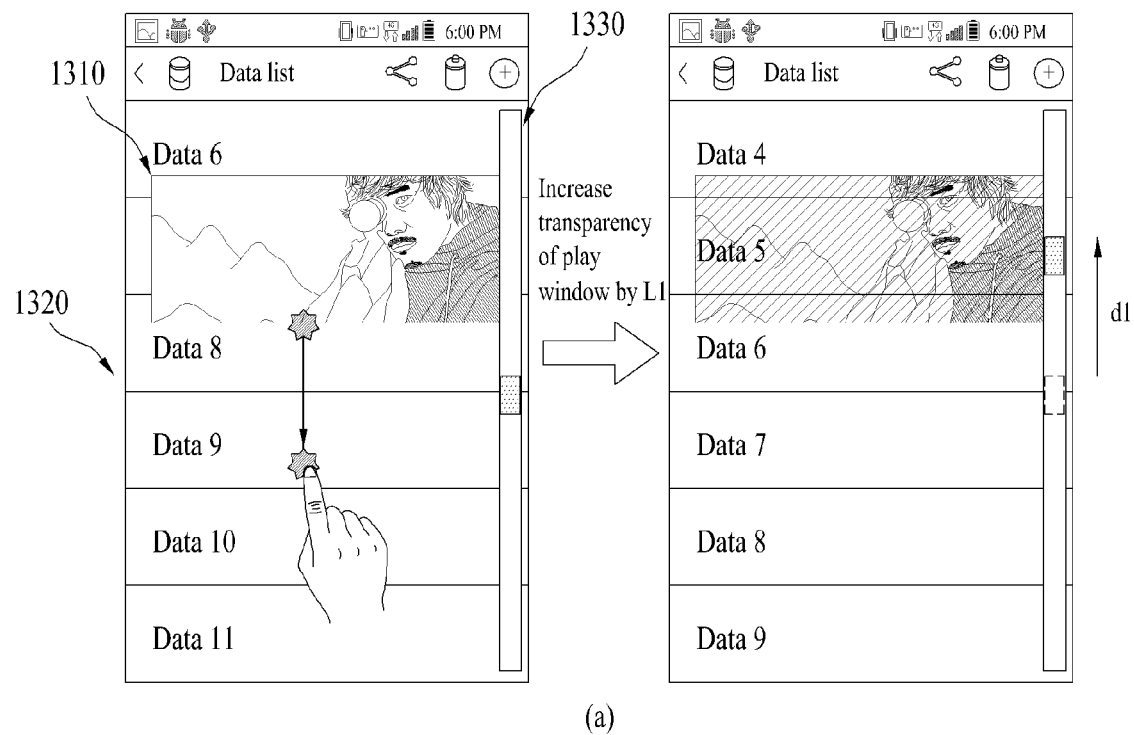
(a)
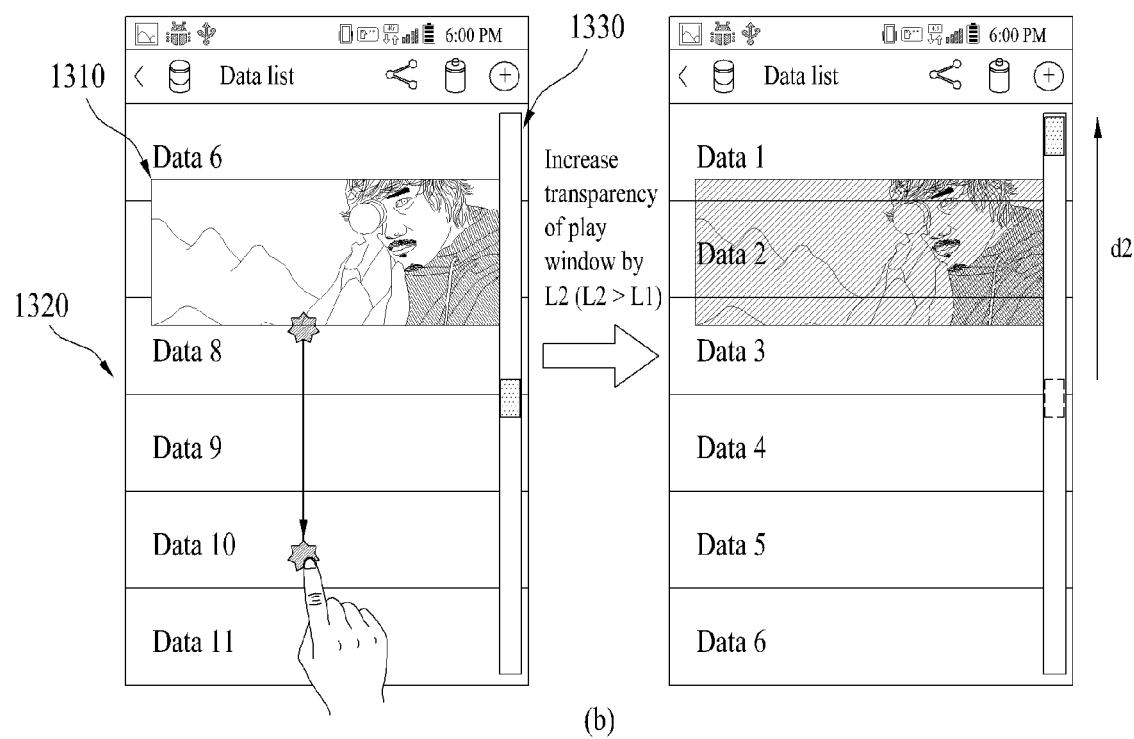
(b)

FIG. 15
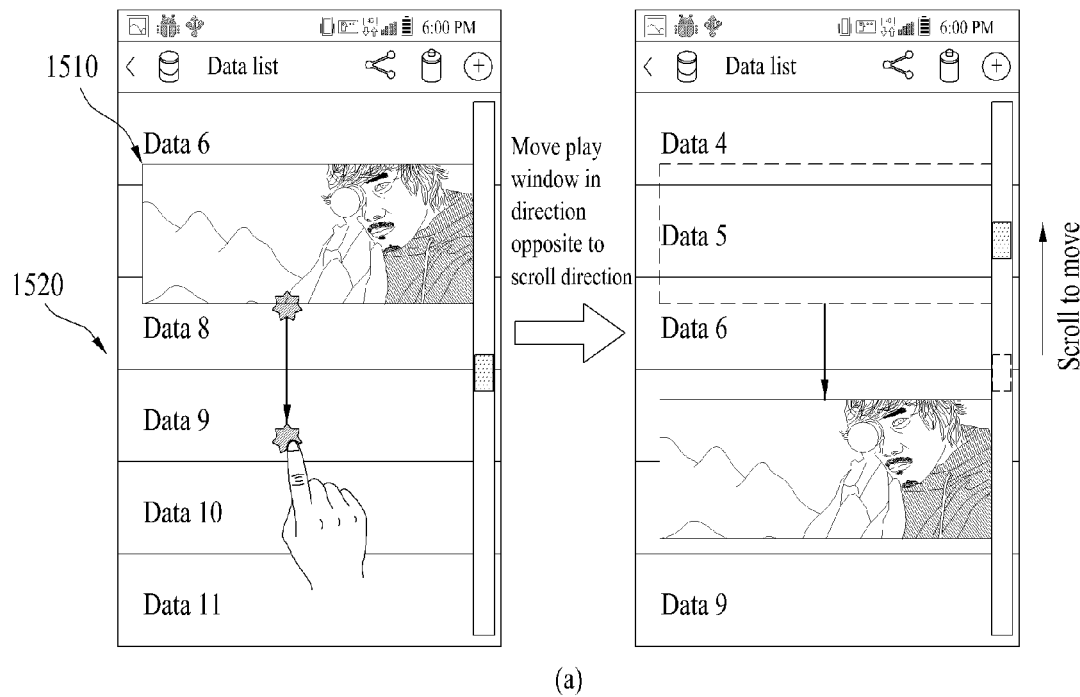
(a)
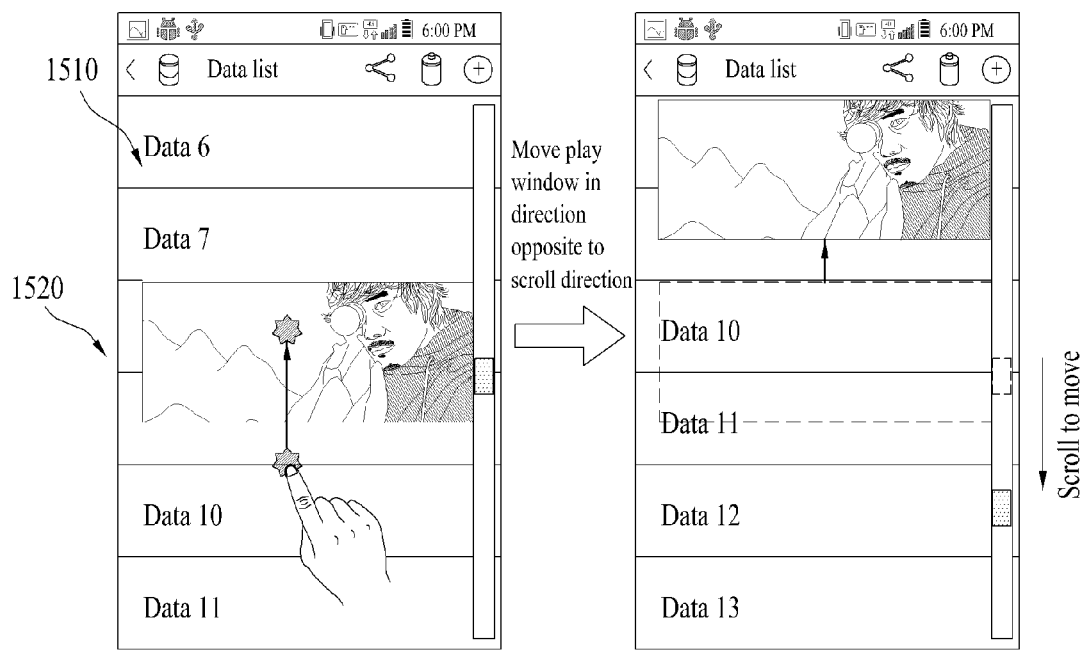
(b)

FIG. 16
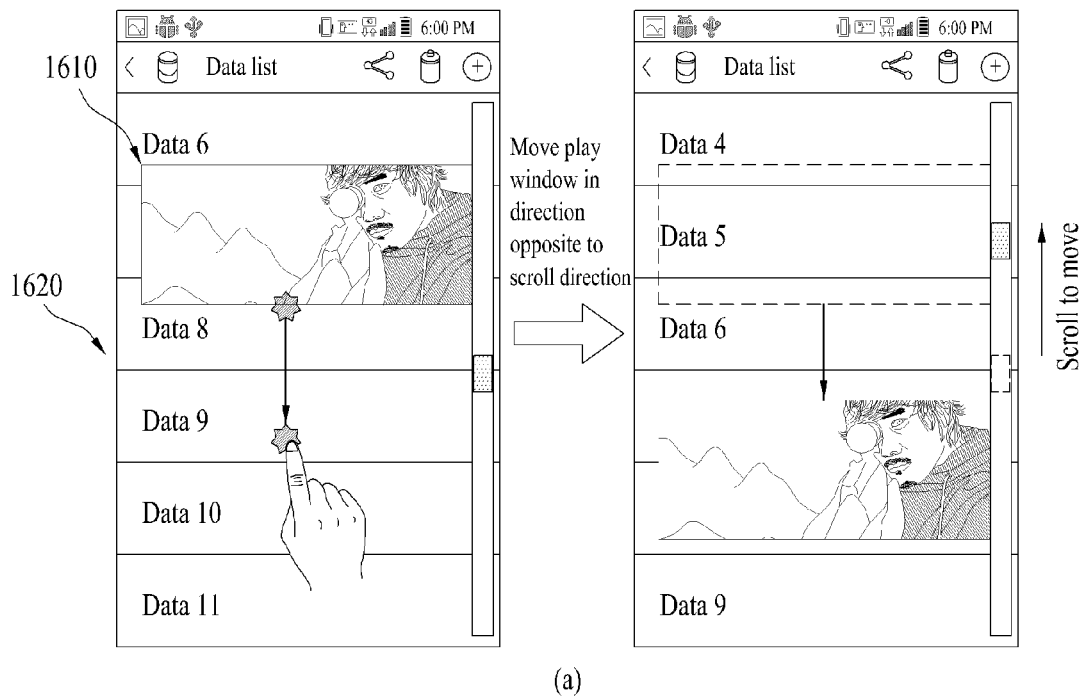
(a)
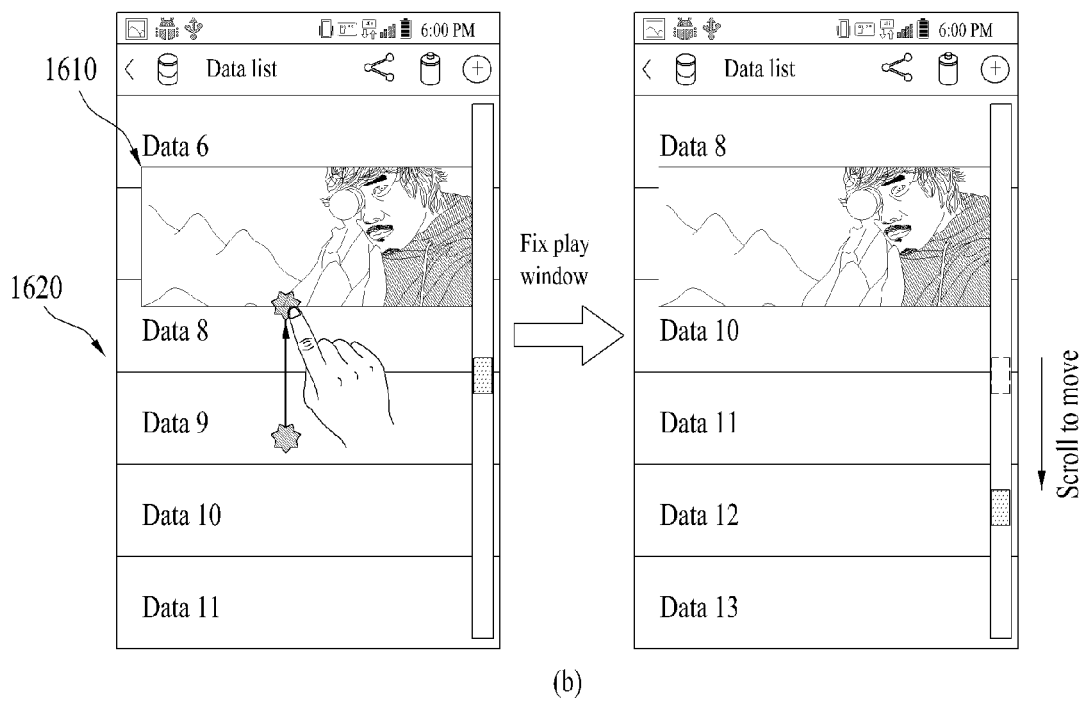
(b)

FIG. 17
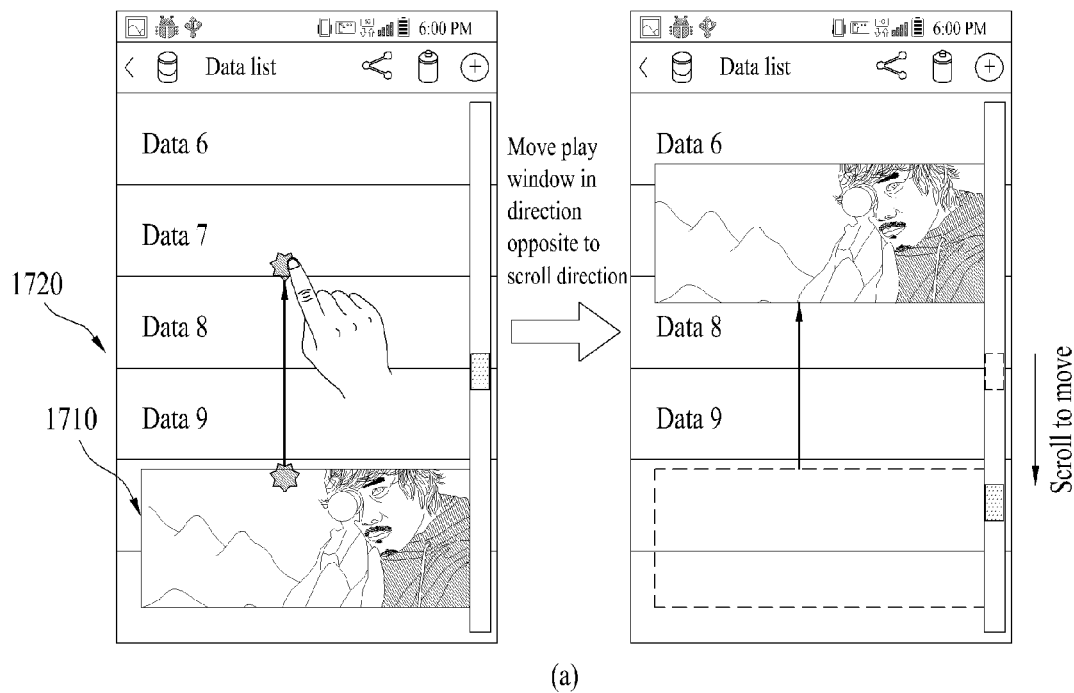
(a)
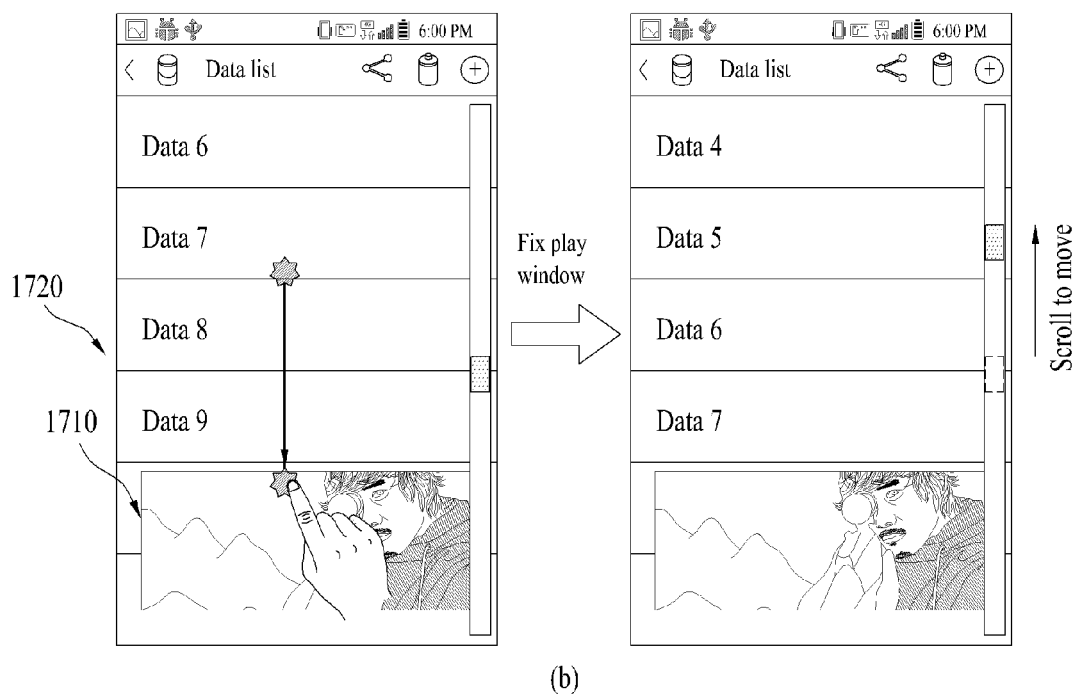
(b)

FIG. 18
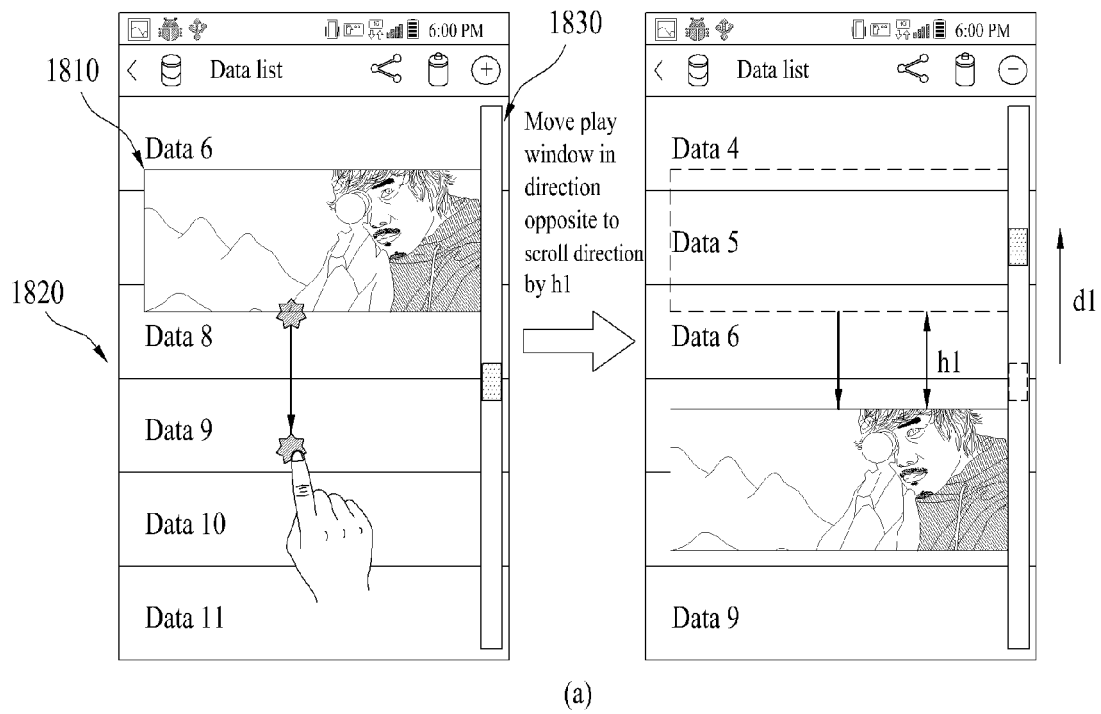
(a)
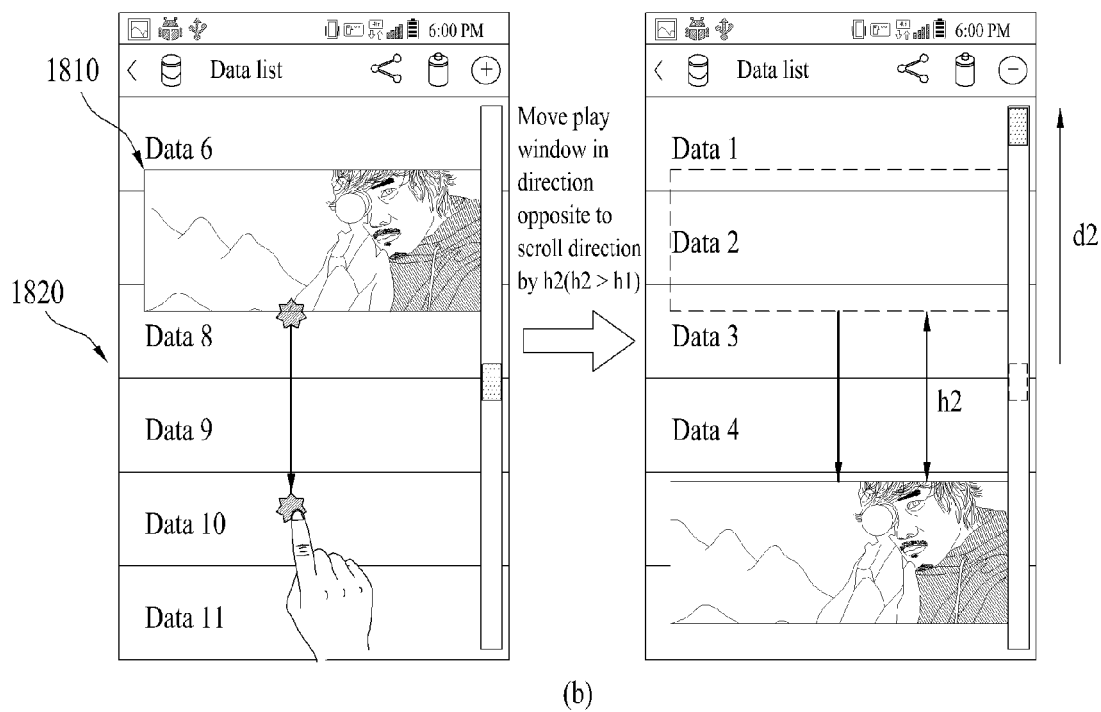
(b)

FIG. 21
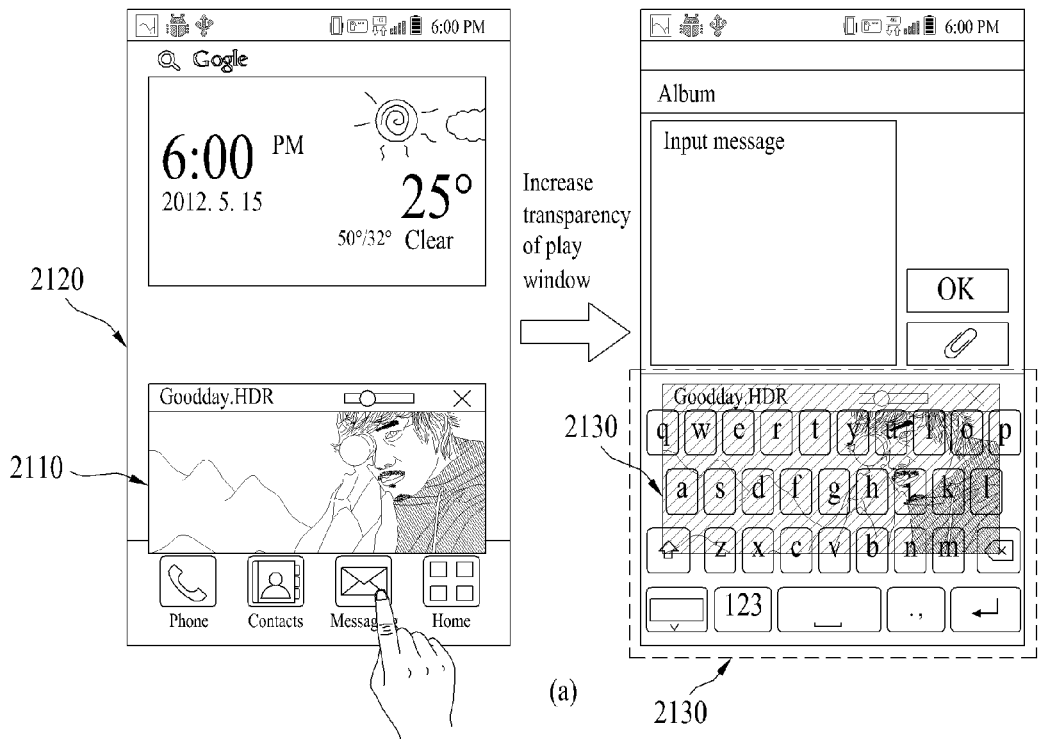
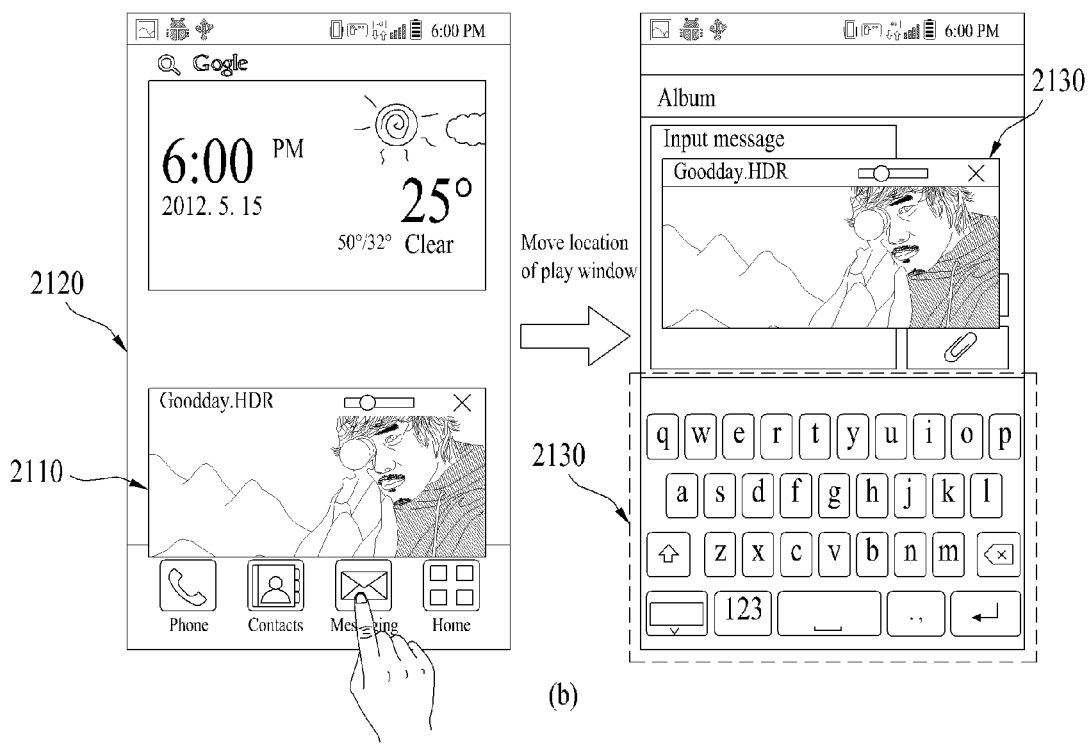

MOBILE TERMINAL AND CONTROLLING METHOD THEREOF

Pursuant to 35 U.S.C. §119(a), this application claims the benefit of earlier filing date and right of priority to Korean Application No. 10-2013-0062834, filed on May 31, 2013, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for automatically adjusting transparency and output location of a video.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Performance of a mobile terminal is continuously enhanced. Hence, like a fixed terminal, a mobile terminal can establish a multitasking environment for processing a plurality of tasks simultaneously. Yet, since a screen size of a mobile terminal is smaller than that of a fixed terminal, it is necessary to provide a method of utilizing a space efficiently.

If a screen of a mobile terminal is partitioned into a plurality of regions and different tasks are processed through a plurality of the regions, respectively, since a size of each of the regions respectively assigned to process a plurality of the tasks is reduced, it may cause inconvenience to a user. In order to prevent such an inconvenience, it may be able to consider a method of overlaying one prescribed window opened for a multitasking job on another window.

In doing so, it may not cause a problem of reducing a size of a task window. Yet, it may cause a problem that one task window blocks another task window. Hence, in a multitasking environment, when one task window blocks another task window, the demand for a solution for visualizing the blocked region is expected to rise.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, when a task window is blocked due to a play window in a multitasking environment, one object of the present invention is to provide a mobile terminal and controlling method thereof, by which visibility of the blocked region can be secured.

In case that a level of user's concentration on a video is lowered in a multitasking environment, another object of the present invention is to provide a mobile terminal and controlling method thereof, by which a video play timing point can be restored into a user's concentration lowered timing point.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, in performing multitasking for processing an additional task while playing a video, a mobile terminal according to the present invention may include a display unit configured to display a play window for outputting the video by overlaying the play window on a task window for processing the additional task and a controller, if a user input for scrolling the task window is received, scrolling the task window in response to the user input, the controller automatically adjusting at least one of a transparency of the play window and a display location of the play window.

In another aspect of the present invention, as embodied and broadly described herein, in performing multitasking for processing an additional task while playing a video, a method of controlling a mobile terminal according to the present invention may include the steps of displaying a play window for outputting the video by overlaying the play window on a task window for processing the additional task, receiving a user input for scrolling the task window, and automatically adjusting at least one of a transparency of the play window and a display location of the play window while scrolling the task window in response to the user input.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 7 is a diagram for one example to describe that a play timing point of a video is adjusted in response to a selection of a bookmark;

FIG. 8 is a diagram for one example to describe that a play of a video is paused if an event occurs through a task window;

FIG. 10 is a diagram for one example to describe that a transparency of a play window is adjusted in response to a user input for scrolling a task window;

FIG. 11 and FIG. 12 are diagrams for one example to describe that a transparency of a play window is adjusted in consideration of a display location of the play window and a scroll direction;

FIG. 13 is a diagram for one example to describe that a transparency is adjusted depending on a scroll moving distance of a task window;

FIG. 15 is a diagram for one example to describe that a display location of a play window is adjusted in response to a user input for scrolling a task window;

FIG. 16 and FIG. 17 are diagrams for one example to describe an operation of a mobile terminal when a display location of a play window is slanted in a specific direction;

FIG. 18 is a diagram for one example to describe that a moving distance of a play window is adjusted in response to a scroll moving distance of a task window;

FIG. 21 is a diagram for one example to describe an operation of a mobile terminal when a play window blocks an object displayed on a task window.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
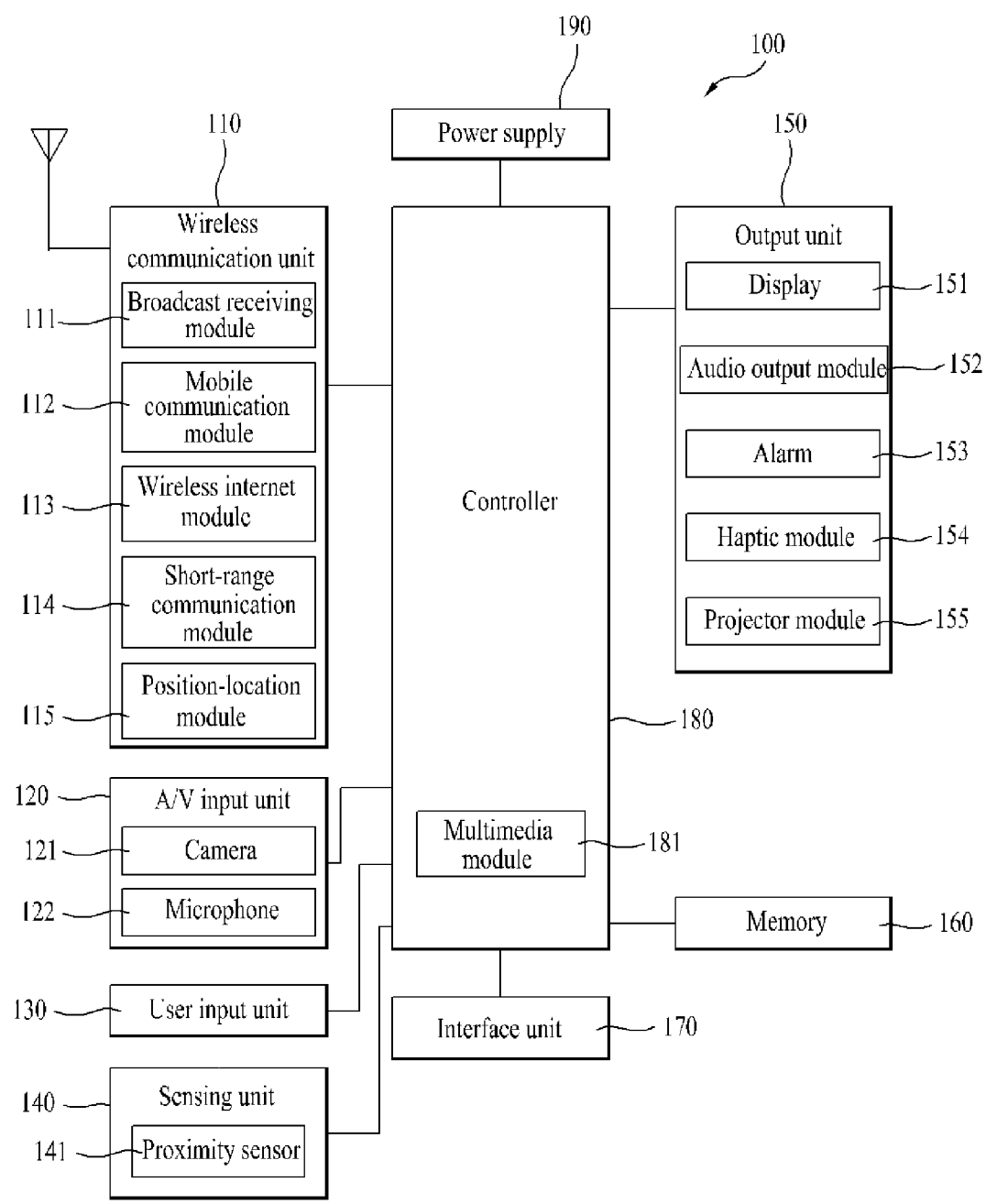
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
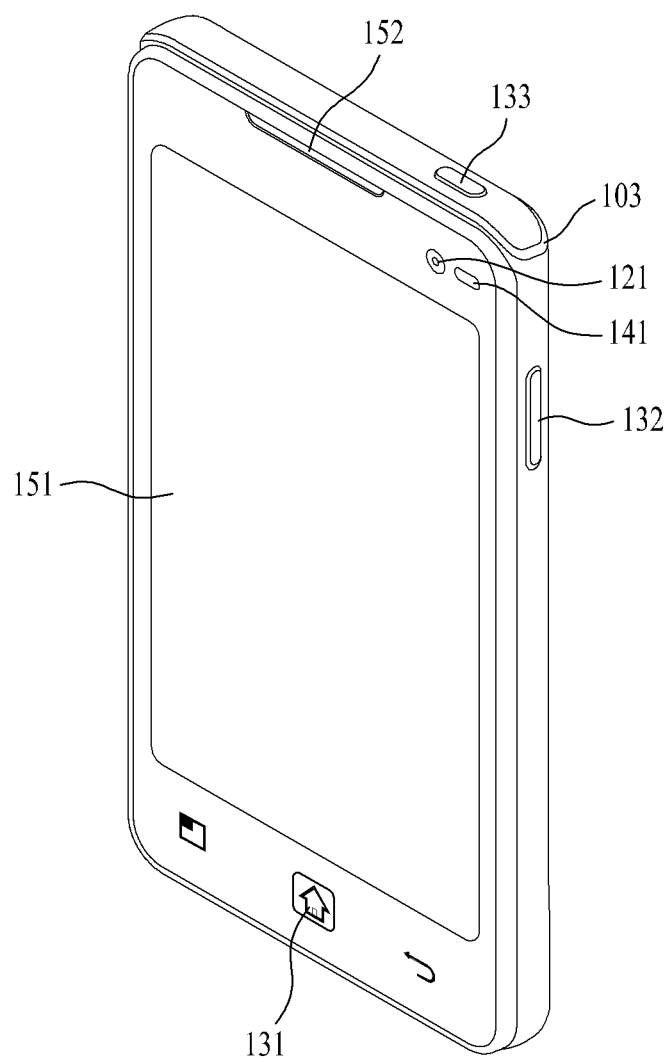
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
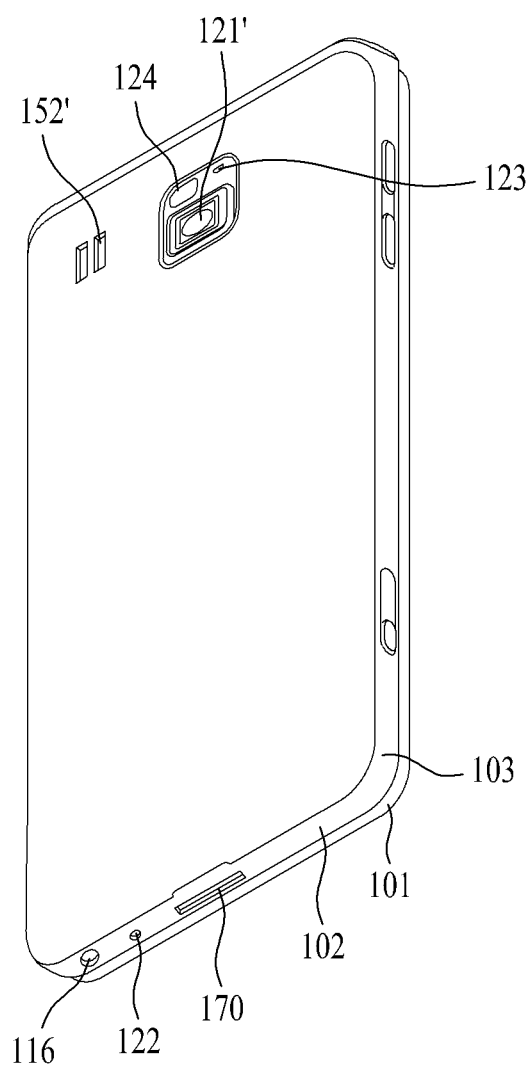
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal mentioned in the following description includes at least one of the components shown in FIG. 1. In particular, assume that a mobile terminal according to the present invention includes the display unit 151, the memory 160 and the controller 180. In some cases, assume that the mobile terminal 100 according to the present invention further includes the wireless communication unit 110.

The display unit 151 of the mobile terminal 100 mentioned in the description of the present invention can be implemented with a touchscreen. If the display module or unit 151 is implemented with the touchscreen, the display unit 151 can play both a role as an output device for outputting information and a role as an input device for receiving a user input. If the display unit 151 does not include the touchscreen, the mobile terminal according to the present invention may further include a separate input device configured to receive a user input. For clarity of the following description, assume that the display unit 151 in the following embodiments includes the touchscreen.

In the following description, a mobile terminal 100 according to the present invention is explained in detail with reference to the accompanying drawings.

Figure 4:
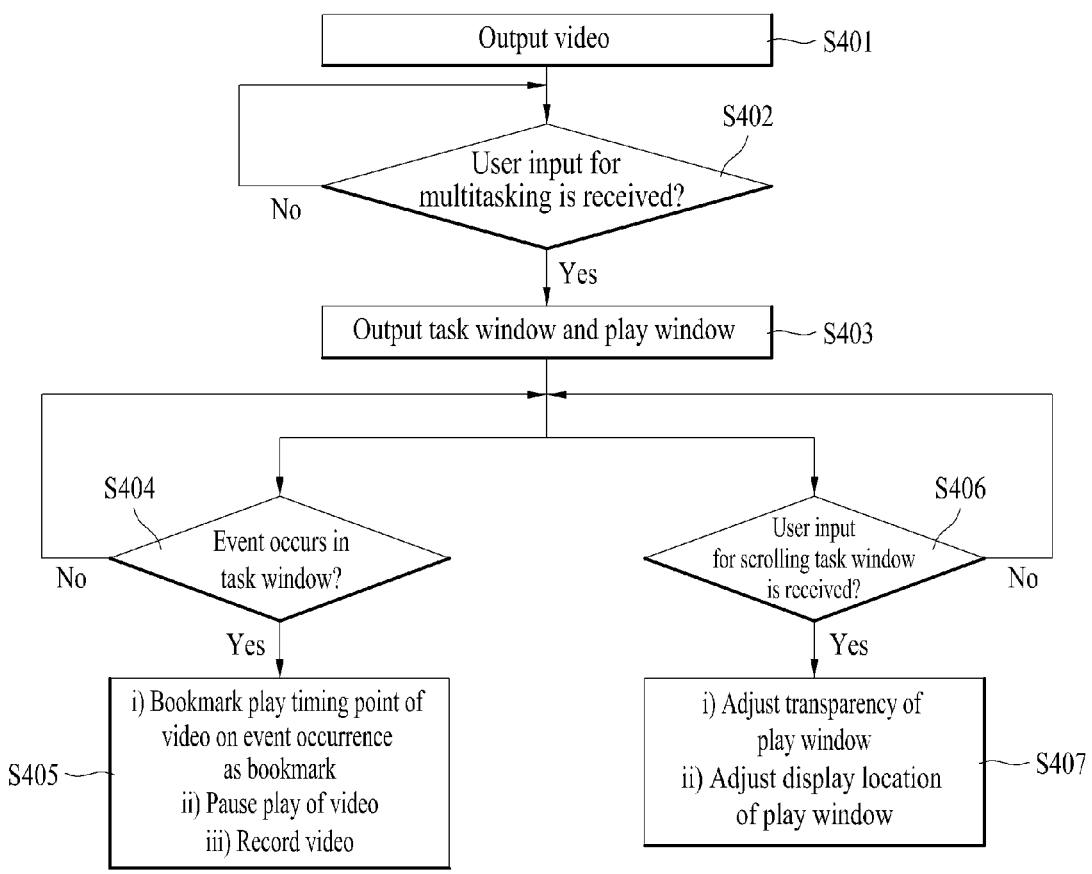
FIG. 4 is a flowchart for an operation of a mobile terminal according to the present invention.

FIG. 4 is a flowchart for an operation of a mobile terminal according to the present invention.

Referring to FIG. 4, the controller 180 plays a video and controls the video to be outputted through the touchscreen [S401]. Videos playable by the controller 180 may include a video saved in the memory 160, a video streaming-played by being received from a remote terminal (or server), a video received by real time from a call counterpart terminal in the course of a video call, a broadcast video received from a broadcast server and the like.

While the video is outputted, if a user input for multitasking is received [S402], the controller 180 continues to play the video and can control a task window for processing an additional task and a play window for outputting the continuously video to be displayed [S403]. Hence, it is able to establish a multitasking environment in which a video playback and an additional task can be simultaneously processed. And, the play window can be displayed by overlaying the task window.

Figure 5:
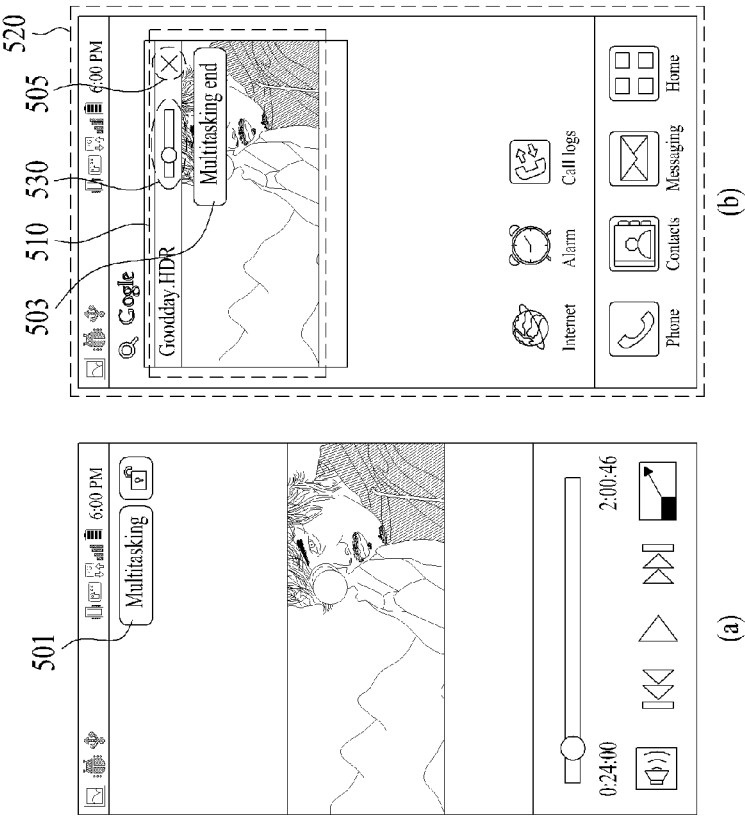
FIG. 5 is a diagram for one example of overlaying a play window on a task window.

For instance, FIG. 5 is a diagram for one example of overlaying a play window on a task window.

Referring to FIG. 5, while a video is played, if the controller 180 receives a user input for multitasking from a user (e.g., a touch to a multitasking button 501 shown in FIG. 5(a)) [FIG. 5(a)], the controller 180 displays a task window 520 for processing an additional task and controls a play window 510 for outputting the video to be displayed over the task window 520 [FIG. 5(b)].

A user is able to process the additional task through the task window 520 while continuously watching the video through the play window 510. In this case, the additional task may mean a task (or job) that can be processed by the controller 180 in addition to the playback of the video outputted through the play window 510. In FIG. 5(b), since a home screen image is currently outputted through the task window 520, such an additional task as an activation of an application, a phone call, a message composition and the like can be performed on the home screen. Therefore, the controller 180 can process the additional task based on the user input to the task window 520 while playing the video outputted through the play window 510.

Referring to FIG. 5(b), if the play window 510 is displayed in a manner of overlaying the task window 520, the play window 510 inevitably blocks a portion of the task window 520. Hence, in displaying the play window 510, the controller 180 can control a transparency adjust bar 530, which is provided to adjust a transparency of the play window 510, to be displayed. Based on a user input to the transparency adjust bar 530, the controller 180 may be able to adjust the transparency of the play window 510. In case that the play window 510 is displayed semi-transparently, a user may watch the play window 510 and a part behind the play window 510 (i.e., a region of the task window 520 blocked by the play window 510).

In response to a user input for terminating the established multitasking environment, the controller 180 can terminate the established multitasking environment at any time. For instance, if a button 'x' 505 for ending the play window 510 is touched in the example shown in FIG. 5(b), referring to FIG. 5(c), the controller 180 stops playing the video and is able to control the task window 520 to be displayed only. For another instance, if a button 'multitasking end' 503 is touched in the example shown in FIG. 5(b), referring to FIG. 5(b), the controller 180 stops processing the additional task and is able to control the video to be outputted only. In particular, as shown in FIG. 5(c) and FIG. 5(d), the controller 180 stops outputting one of the play window 510 and the task window 520 and is also able to end the established multitasking environment.

In the example shown in FIG. 5(b), the play window 510 is displayed by overlaying the task window 520, by which the present embodiment may be non-limited. For instance, the controller 180 displays the play window 510 as a full screen and is also able to control the task window 520 to be displayed in a manner of overlaying the play window 510. Alternatively, the controller 180 partitions the touchscreen into two regions and controls the task window 520 and the play window 510 to be displayed on the two regions, respectively.

Before the multitasking environment is established, a user is able to concentrate on watching the video. Yet, after the multitasking environment has been established, user's concentration is distracted away into the video and the additional task. In particular, under the multitasking environment, the user's concentration on the video may be reduced. Due to the reduction of the concentration on the video, the user may not be able to aware of the content of the video correctly. If the user's concentration on the video is determined as reduced, in particular, if an event occurs through the task window [S404], the controller 180 can perform at least one of the following actions [S405].

i) Bookmark a play timing point of a video on an event occurrence as a bookmark ii) Pause a play of video iii) Record video In this case, the event occurring through the task window means a task of a specific type occurring through the task window and may include at least one of an activation of an application, an output of a text input device (e.g., IME (input method editor)), an entry into a text input mode, a reception/transmission of a message, a phone call connection and the like. And, various operations possibly reducing user's concentration on video may be included in the events as well as the above-enumerated operations. In case that an event occurs through a task window, operations of the mobile terminal 100 shall be described in detail with reference to the accompanying drawings as follows.

Figure 6:
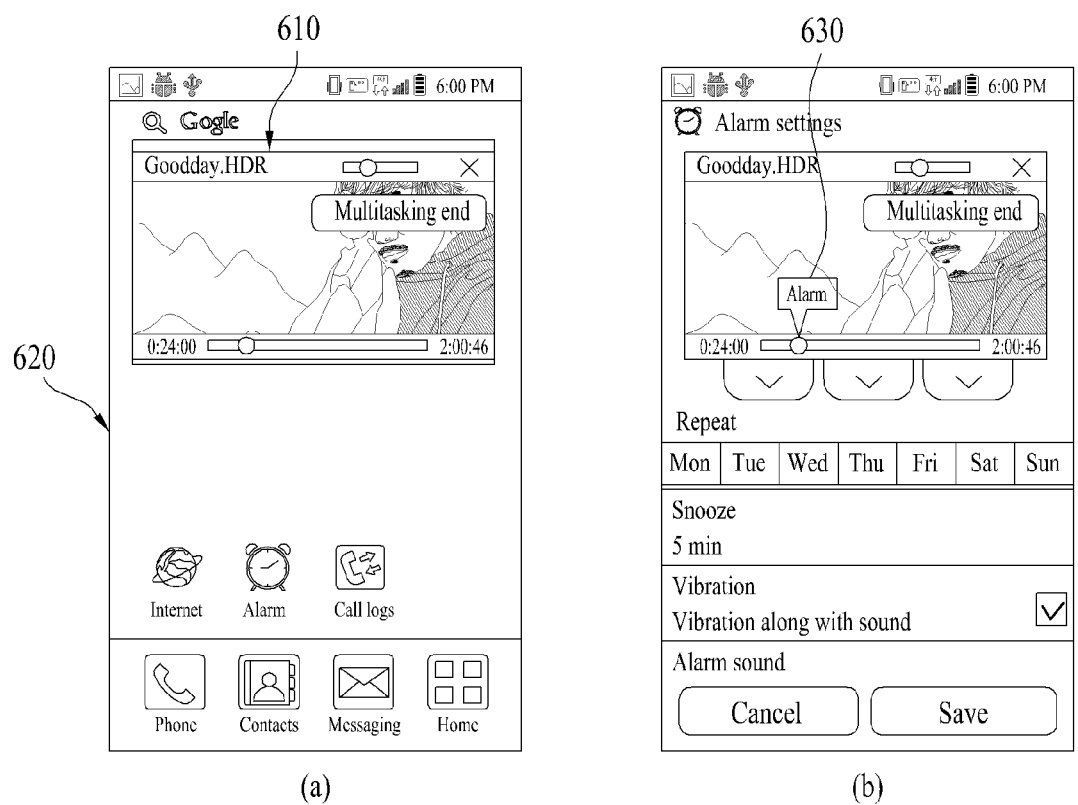
FIG. 6 is a diagram for one example to describe that a play timing point of a video on an event occurrence is set as a bookmark.

FIG. 6 is a diagram for one example to describe that a play timing point of a video on an event occurrence is set as a bookmark. For clarity of the following description, assume that an event occurring through a task window includes an activation of an application. Assume that a current play timing point of a video is displayed on a left side of a play status display bar indicating a play timing point of the video. And, assume that a running time of the video is displayed on a right side of the play status display bar.

Referring to FIG. 6(a), while a play window 610 is displayed by overlaying a task window 620, the controller 180 can determine a task to process additionally through the task window 620 in response to a user input. For instance, if a user touches an icon currently displayed through the task window 620 [FIG. 6(a0), the controller 180 activates an application corresponding to the icon touched by the user while playing the video continuously and is able to control the application to be outputted through the task window 620.

In doing so, the controller 180 can bookmark a play timing point of the video on activating the application. In FIG. 6(a) and FIG. 6(b), since the play timing point of the video on activating the application is 1:00:00, the controller 180 can bookmarks the timing point 1:00:00. Thus, if a bookmark is set in every event of an activation of an application, the controller 180 can set the bookmarks as many as the number of application activations.

The controller 180 can visually display the set bookmark. For instance, referring to FIG. 6(b), the controller 180 can control a bookmark to be displayed on the play status display bar indicating a play timing point of the video. In particular, the controller 180 can control a graphic object 630, which indicates a play timing point corresponding to the bookmark set on the play status display bar, to be displayed.

In doing so, the controller 180 can attach a label for identifying a type of an occurring event to the graphic object 630. For instance, if the bookmark is set by an activation of an application, referring to FIG. 6(b), the controller 180 can control a name, which represents the application, to be displayed on the graphic object 630. After the multitasking environment has ended, the bookmark can be displayed visually.

While a video is played, if a user selects a bookmark, the controller 180 can set a play timing point of the video to a play timing point corresponding to the selected bookmark. This is described in detail with reference to FIG. 7 as follows.

FIG. 7 is a diagram for one example to describe that a play timing point of a video is adjusted in response to a selection of a bookmark. For clarity of the following description, assume that 2 bookmarks are set on a video. In particular, one of the two bookmarks is assumed as set by an activation of a 'music' application and the other is assumed as set by an activation of an 'alarm' application.

Referring to FIG. 7(a), the controller 180 can control set bookmarks 712 and 714 to be visually displayed. While a video is played (particularly, a play timing point of the video is 1:30:00 in FIG. 7(a)), if one of the set bookmarks is selected (e.g., a bookmark 'alarm' 714 is selected in FIG. 7(a)), referring to FIG. 7(b), the controller 180 can adjust the play timing point of the video into a play timing point indicated by the selected bookmark 714 (e.g., the play timing point of the video is adjusted into 1:00:00).

Hence, a user can watch the video again from a timing point of losing concentration on the video due to an event occurrence.

FIG. 8 is a diagram for one example to describe that a play of a video is paused if an event occurs through a task window. For clarity of the following description, assume that an event occurring through a task window 820 is an entry into a text input mode. To help the understanding of the drawing, a text (e.g., 'playing', 'paused', etc.) shall be inserted in the drawing to indicate a play status of the video.

Referring to FIG. 8(a), while a play window 810 is displayed by overlaying a task window 820, the controller 180 can determine a task to additionally process through the task window 820 in response to a user input. For instance, if a user takes an action of attempting to input a text through the task window 820 (e.g., a touch to a text application, etc.)

[FIG. 8(a)], the controller 180 enters a text input mode and is able to control a text input tool 830 to be displayed [FIG. 8(b)].

In doing so, the controller 180 can pause the play of the video as shown in FIG. 8(b). If the user applies a user input to resume the play of the video or the text input mode is ended (e.g., the text input tool 830 stops being displayed) [FIG. 8(c)], the controller 180 can resume the play of the video.

If an event occurs through the task window 820, since user's concentration power will be focused not on the play window 810 but on the task window 820, as shown in FIG. 8, the controller 180 can pause the play of the video until an environment for enabling the user to concentrate on the play window 810 again is established.

Figure 9:
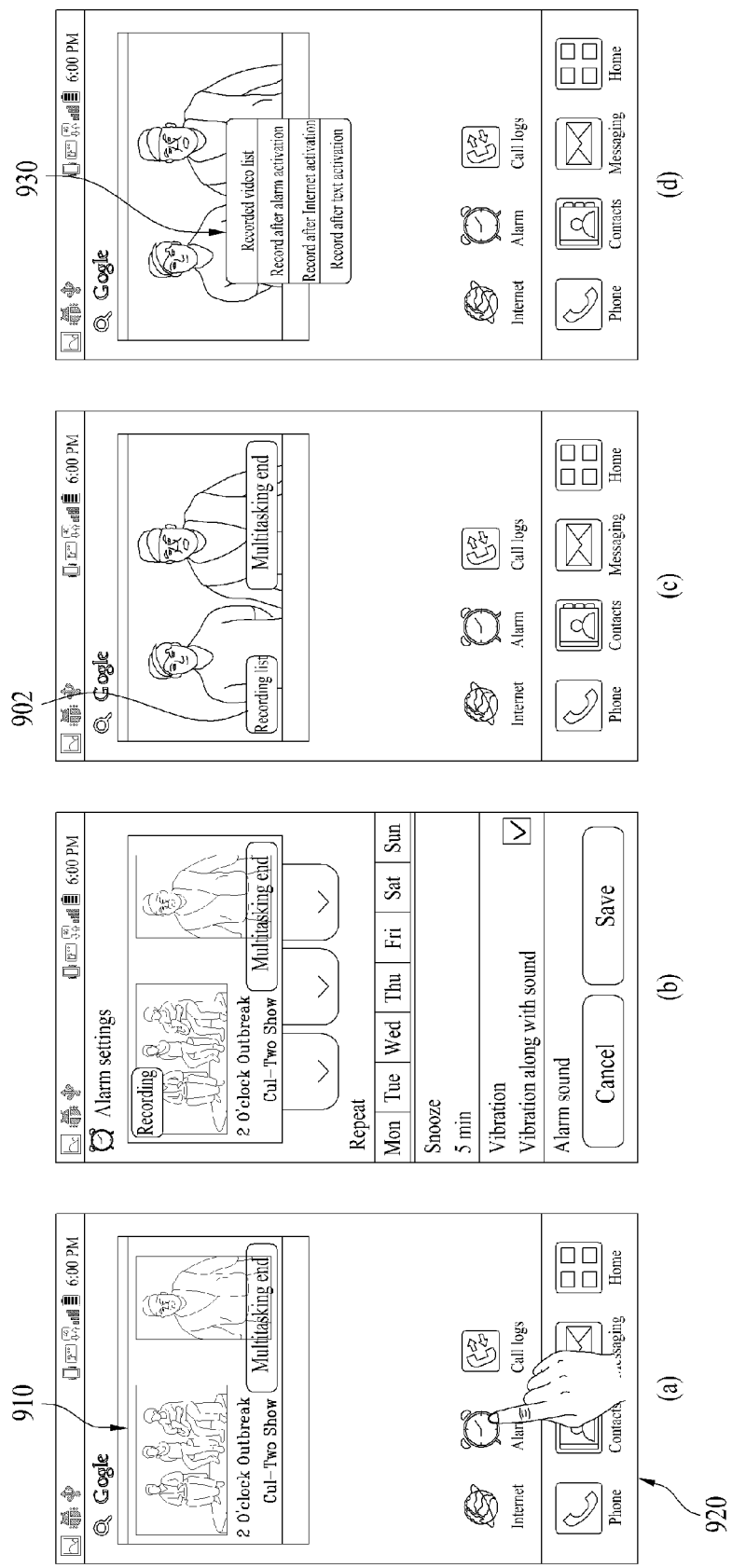
FIG. 9 is a diagram for one example to describe that a video is recorded if an event occurs through a task window.

FIG. 9 is a diagram for one example to describe that a video is recorded if an event occurs through a task window. For clarity of the following description, an event occurring through a task window 920 includes an activation of an application. To help the understanding of the drawing, a text (e.g., recording) is inserted in the drawing to indicate a recording status of a video.

Referring to FIG. 9(a), while a play window 910 is displayed by overlaying a task window 920, the controller 180 can determine a task to additionally process through the task window 920 in response to a user input. For instance, if a user touches an icon displayed through the task window 920 [FIG. 9(a)], referring to FIG. 9(b), the controller 180 activates an application corresponding to the user-touched icon while continuing to play the video and is able to control the application to be outputted through the task window 920.

In doing so, referring to FIG. 9(b), the controller 180 can start a recording of the video while activating the application. If a user applies a user input for stopping the recording of the video or the application is stopped (or ended) [FIG. 9(c)], the controller 180 can end the recording of the video.

Thereafter, the controller 180 can play the recorded video in response to a user input. For instance, if a recording list button 902 is touched [FIG. 9(c)], the controller 180 can control a recorded video list 930 to be displayed [FIG. 9(d)]. In displaying the recorded video list 930, the controller 180 can attach a label for identifying a type of an occurring event to each of the recorded videos. For instance, in the example shown in FIG. 9(d), an item 'record after internet activation' may indicate a video file recorded by starting from a timing point of activating an internet application. And, an item 'record after alarm activation' may indicate a video file recorded by starting from a timing point of activating an alarm application.

The video recording can be further effective if a video includes a broadcast video, a streaming video or the like. Moreover, it is not necessary for the video recording to be interrupted in response to the interruption (or end) of the application. In order to implement a time shift of resuming the play of the video from a timing point of an event occurrence, the controller 180 can continue to record the video after the interruption (or end) of the application.

In the example shown in FIG. 4, if an event occurs through a task window, it is able to perform at least one of operations including i) bookmarking a play timing point of a video on an event occurrence as a bookmark, ii) pausing a play of video, and iii) recording video. According to the present invention, the controller 180 can selectively perform one of the above-enumerated operations in response to a type of an occurring event or a type of the video.

For instance, the controller 180 grades a level for an event occurring through the task window to reduce user's concentration on the play window. If a first event having a low level of reducing the concentration occurs, the controller 180 controls a play timing point of a video on an event occurrence to be bookmarked. If a second event having a high level of reducing the concentration occurs, the controller 180 controls a play of a video to be paused in case of an event occurrence.

For another instance, the controller 180 discriminates a case that a video is a broadcast video from a case that a video is not a broadcast video. If the video is not the broadcast video, the controller 180 bookmarks a play timing point of the video on an event occurrence or controls a play of the video to be paused in case of an event occurrence. If the video is the broadcast video, the controller 180 can control the video to be recorded in case of the event occurrence.

As mentioned in the foregoing description with reference to FIG. 5, when a play window is displayed by overlaying a task window, the play window blocks the task window in part. Hence, in order to for a user to watch a part behind (or under) the play window (i.e., a region of the task window blocked by the play window), a location of the play window is changed or the play window needs to be displayed semi-transparently.

If the controller 180 determines that a user intends to check the part behind the play window, the controller 180 changes a display location of the play window automatically or can increase a transparency of the play window. In particular, if a user input for scrolling the task window is applied [S406], the controller 180 scrolls the task window and is able to perform at least one of the following operations [S407].

i) Adjust a transparency of a play window
ii) Adjust a display location of a play window In this case, the transparency of the play window is a scale for indicating a transparent level of the play window. If the transparency is low, it may mean that the play window gets close to a non-transparent state. If the transparency is high, it may mean that the play window gets close to a transparent state. In the following description, if a transparency of a play window is increased, it may mean that a non-transparent state of the play window is adjusted into a semi-transparent state or that the play window in the semi-transparent state is adjusted to enter a further transparent state. On the contrary, if a transparency of a play window is decreased, it may mean that a semi-transparent state of the play window is adjusted into a non-transparent state or that the play window in the semi-transparent state is adjusted to enter a further non-transparent state.

In case that a user input for scrolling a task window is applied, an operation of the mobile terminal 100 is described in detail with reference to the accompanying drawing as follows. First of all, a process for adjusting a transparency of a play window is described. Secondly a process for adjusting a display location of the play window is described. For the facilitation of the drawing, like the example shown in FIG. 10, a case of setting a play window in a semi-transparent state shall be discriminated from a case of setting a play window in a non-transparent state.

FIG. 10 is a diagram for one example to describe that a transparency of a play window is adjusted in response to a user input for scrolling a task window. For clarity of the following description, assume that a prescribed data list is currently displayed through a task window. And, assume that 15 data Data 1 to Data 15 are included in the prescribed data list. Moreover, the 15 data Data 1 to Data 15 are sorted in ascending order from top to bottom. A scroll direction for approaching a data (i.e., Data 1) located at the top may be defined as a top direction. And, a scroll direction for approaching a data (i.e., Data 15) located at the bottom may be defined as a bottom direction. A user input for scrolling the data list in the top direction may include an action of dragging or flicking a pointer in the bottom direction (or the top direction). And, a user input for scrolling the data list in the bottom direction may include an action of dragging or flicking a pointer in the top direction (or the bottom direction). In particular, a moving direction of a task window by being scrolled may be opposite (or equal) to a user's touch direction.

Referring to FIG. 10, while a play window and a task window are displayed, if a user input (e.g., a drag, a flicking, etc.) for scrolling the task window is received [FIG. 10(a)], the controller 180 can control a transparency of the play window to increase [FIG. 10(b)]. Hence, the play window can be displayed in a semi-transparent state changed from a non-transparent state. Thus, a user can check a substance or content displayed on the task window that is not blocked by the play window.

According to one embodiment of the present invention, the controller 180 can control the play window to maintain its semi-transparent state only if a user's touch for scrolling the task window is being maintained. For instance, a state of the play window is set to a semi-transparent state while a touch to the touchscreen is maintained [FIG. 10(b)]. In doing so, if the touch is removed from the touchscreen, the state of the play window can be set to a non-transparent state again [FIG. 10(c)].

The controller 180 can adjust a transparency of a play window in consideration of a display location of the play window and a scroll direction. This is described in detail with reference to FIG. 11 and FIG. 12 as follows.

FIG. 11 and FIG. 12 are diagrams for one example to describe that a transparency of a play window is adjusted in consideration of a display location of the play window and a scroll direction. For clarity of the following description, assume that the same assumptions as applied to the description with reference to FIG. 10 are applied to the following descriptions with reference to FIG. 11 and FIG. 12. And, assume that a play window 1110/1210 is located by being slanted in a top or bottom direction of the touchscreen. In this case, when the touchscreen is partitioned into two parts (i.e., an upper part and a lower part), if a center of the play window 1110/1210 is located in the upper part of the touchscreen, it may be understood as the play window 1110/1210 is located by being slanted in the top direction of the touchscreen. If a center of the play window 1110/1210 is located in the lower part of the touchscreen, it may be understood as the play window 1110/1210 is located by being slanted in the bottom direction of the touchscreen.

Referring to FIG. 11(a), while the play window 1110 is located by being slanted in the top direction of the touchscreen, if the task window 1120 is scrolled in the top direction, the controller 180 is able to control a transparency of the play window 1110 to increase while scrolling the task window 1120 in the top direction.

For another instance, referring to FIG. 12(a), while the play window 1210 is located by being slanted in the bottom direction of the touchscreen, if the task window 1220 is scrolled in the bottom direction, the controller 180 is able to control a transparency of the play window 1210 to increase while scrolling the task window 1220 in the bottom direction.

If the task window 1120/1220 is scrolled in a direction oppose to the slanted direction of the play window 1110/1210, the controller 180 can maintain or decrease a transparency of the play window 1110/1210. For instance, referring to FIG. 11(b), while a state of the play window 1110 located by being slanted in the top direction of the touchscreen is set to a semi-transparent state, if the task window 1120 is scrolled in the bottom direction, the controller 180 can control the play window 1110 to keep staying in the non-transparent state. If the play window 1110 is in the semi-transparent state, the controller 180 may be able to decrease the transparency of the play window 1110.

For another instance, referring to FIG. 12(b), while a state of the play window 1210 located by being slanted in the bottom direction of the touchscreen is set to a semi-transparent state, if the task window 1220 is scrolled in the top direction, the controller 180 can control the play window 1210 to keep staying in the non-transparent state. If the play window 1210 is in the semi-transparent state, the controller 180 may be able to decrease the transparency of the play window 1210.

Referring to FIG. 11 and FIG. 12, if the task window 1120/1220 is scrolled in the same direction in which the play window 1110/1210 is slanted, the controller 180 can increase the transparency of the play window 1110/1210. On the other hand, if the task window 1120/1220 is scrolled in a direction opposite to the direction in which the play window 1110/1210 is slanted, the controller 180 can decrease the transparency of the play window 1110/1210.

According to one embodiment of the present invention, the controller 180 can adjust a transparency depending on a scroll moving distance of a task window. This is described in detail with reference to FIG. 13 as follows.

FIG. 13 is a diagram for one example to describe that a transparency is adjusted depending on a scroll moving distance of a task window. For clarity of the following description, a scroll moving distance of a task window 1320 shall be described with reference to a scroll bar 1330.

FIG. 13(a) is a diagram for one example that a moving distance of the task window 1320 by being scrolled is d1. FIG. 13(b) is a diagram for one example that a moving distance of the task window 1320 by being scrolled is d2. Referring to FIG. 13(a), while a play window 1310 is located by being slanted in the top direction of the touchscreen, if the task window 1320 is scrolled to move in the top direction by d1, the controller 180 can control a transparency of the play window 1310 to increase by L1. Referring to FIG. 13(b), if the task window 1320 is scrolled to move by d2 (>d1), the controller 180 can control the transparency of the play window 1310 to increase by L2 (>L1). In particular, if the task window 1320 is scrolled in the same direction in which the play window 1310 is slanted, as mentioned in the description of the example with reference to FIG. 13, the controller 180 can control the transparency of the play window 1310 to increase in proportion to the scroll moving distance of the task window 1320.

On the other hand, if the task window 1320 is scrolled in a direction opposite to the direction in which the play window 1310 is slanted, the controller 180 can control the transparency of the play window 1310 to decrease in proportion to the scroll moving distance of the task window 1320 [not shown in the drawing].

According to one embodiment of the present invention, only if a task window is scrolled to move up to the end in the same direction in which a play window is slanted, the controller 180 can control a transparency of the play window to increase. This is described in detail with reference to FIG. 14.

Figure 14:
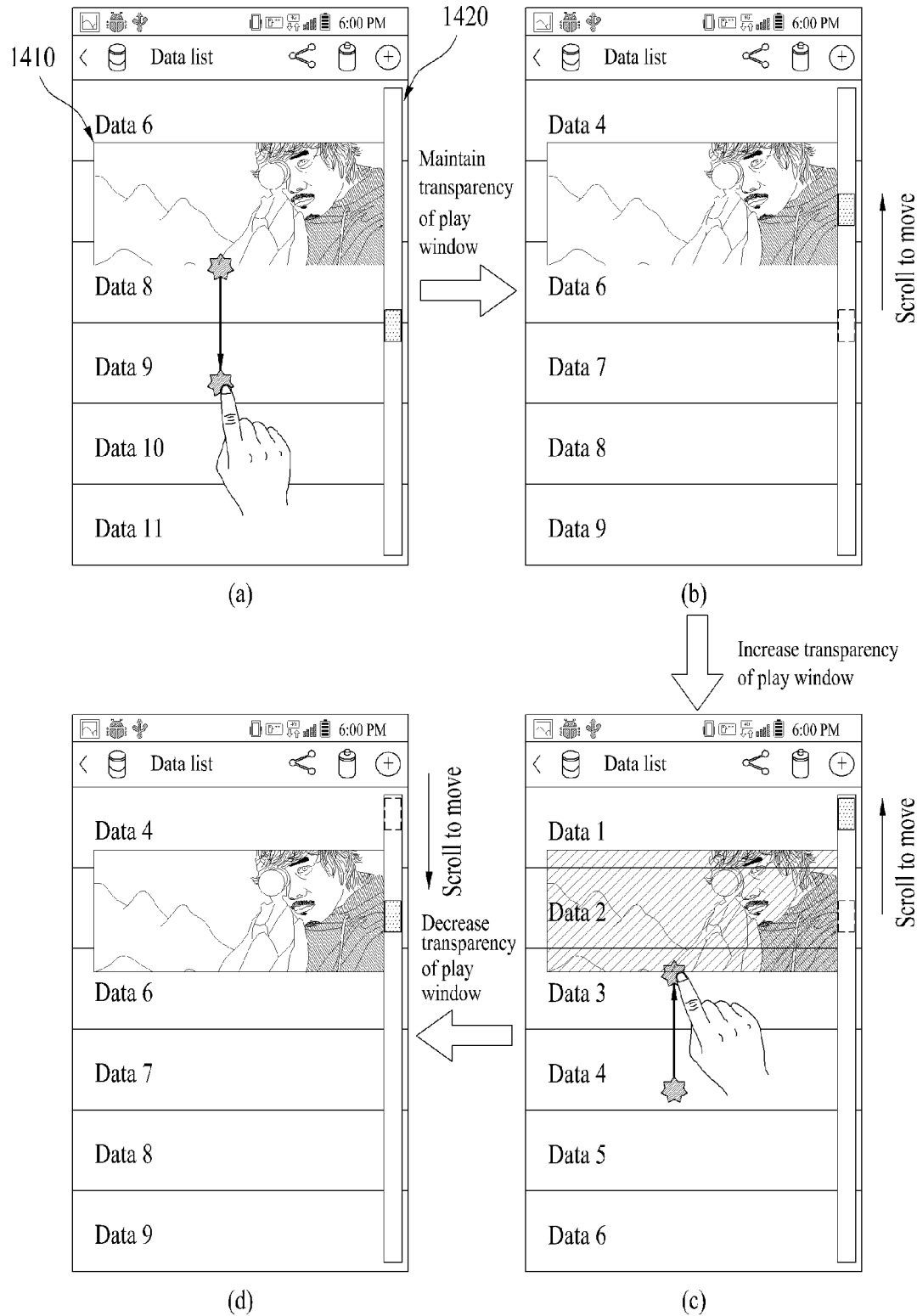
FIG. 14 is a diagram for one example to describe that a transparency of a play window increases if a task window is scrolled to the end in a direction equal to a play window slanted direction.

FIG. 14 is a diagram for one example to describe that a transparency of a play window increases if a task window is scrolled to the end in a direction equal to a play window slanted direction.

Referring to FIG. 14(a), when a play window 1410 in a non-transparent state is located by being slanted to a top side of the touchscreen, if a user input for scrolling a task window 1420 in the top direction is inputted, the controller 180 can control the task window 1420 to be scrolled to move in the top direction in response to the user input. In doing so, referring to FIG. 14(b), if the task window 1420 is not scrolled to move to a top (i.e., Data 1) of a data list, the controller 180 does not adjust a transparency of the play window 1410. After the task window 1420 has scrolled to move to the top of the data list, referring to FIG. 14(c), the controller 180 can control the play window 1410 to enter a semi-transparent state.

While a state of the play window 1410 is set to the semi-transparent state, if a user input for scrolling the task window 1420 in the bottom direction is received, referring to FIG. 14(d), the controller 180 scrolls the task window 1420 in the bottom direction in response to the user input and is able to control the play window 1410 to enter the non-transparent state again.

Like the example shown in FIG. 14, if the task window 1420 is scrolled to move to the end in the same direction in which the play window 1410 is slanted, the controller 180 can increase the transparency of the play window 1410. While the transparency of the play window 1410 is increased, if the play window 1410 is scrolled to move in a direction opposite to the play window slanted direction, the controller 180 can control the transparency of the play window 1410 to return to the state previous to the increase.

In the following description, a process adjusting a display location of a play window is described in detail with reference to FIG. 15 as follows.

FIG. 15 is a diagram for one example to describe that a display location of a play window is adjusted in response to a user input for scrolling a task window. For clarity of the following description, the same assumptions of FIG. 10 shall be applied to FIG. 15.

Referring to FIG. 15(a), while a play window 1510 and a task window 1520 are displayed, if a user input for scrolling the task window 1520 in a first direction (e.g., a top direction) is received, the controller 180 can control the play window 1510 to move in a second direction (e.g., a bottom direction) opposite to the first direction.

On the other hand, if a user input for scrolling the task window 1520 in the second direction is received, referring to FIG. 15(b), the controller 180 can control the play window 1510 to move in the first direction opposite to the second direction.

In particular, like the example shown in FIG. 15, the controller 180 can control a display location of the play window 1510 to move in the direction opposite to the scrolled direction of the task window 1520.

Only if a display location of a play window is slanted in a specific direction, the controller 180 can control the display location of the play window to be changed. This is described in detail with reference to FIG. 16 and FIG. 17 as follows.

FIG. 16 and FIG. 17 are diagrams for one example to describe an operation of a mobile terminal when a display location of a play window is slanted in a specific direction. For clarity of the following description, the same assumptions of FIG. 10 shall be applied to FIG. 16 and FIG. 17.

Referring to FIG. 16, when a play window 1610 is located by being slanted in the top direction of the touchscreen, if a user input for scrolling a task window 1620 in the top direction is received [FIG. 16(a)], the controller 180 can control the play window 1610 to move in the bottom direction while scrolling the task window 1620 in the top direction [FIG. 16(b)].

Referring to FIG. 17, when a play window 1710 is located by being slanted in the bottom direction of the touchscreen, if a user input for scrolling a task window 1720 in the bottom direction is received [FIG. 17(a)], the controller 180 can control the play window 1710 to move in the top direction while scrolling the task window 1720 in the bottom direction [FIG. 17(b)].

If the task window 1620/1720 is scrolled in the direction opposite to the play window slanted direction, a display location of the play window 1610/1710 may not be changed. For instance, if a user input for scrolling the task window 1620 in the bottom direction is received [FIG. 16(a)], the controller 180 can scroll the task window 1620 in the bottom direction while fixing the display location of the play window 1610 [FIG. 16(c)].

For another instance, if a user input for scrolling the task window 1720 in the top direction is received [FIG. 17(a)], the controller 180 can scroll the task window 1720 in the top direction while fixing the display location of the play window 1710 [FIG. 17(c)].

Like the examples shown in FIG. 16 and FIG. 17, if the task window 1620/1720 is scrolled in the same direction in which the play window 1610/1710 is slanted, the controller 180 moves the play window 1610/1710 in the direction opposite to the scrolled direction of the task window 1620/1720. If the task window 1620/1720 is scrolled in the direction opposite to the play window slanted direction, the controller 180 can fix the display location of the play window 1610/1710 thereto.

According to one embodiment of the present invention, the controller 180 can adjust a moving distance of a play window in response to a scroll moving distance of a task window. This is described in detail with reference to FIG. 18 as follows.

FIG. 18 is a diagram for one example to describe that a moving distance of a play window is adjusted in response to a scroll moving distance of a task window. For clarity of the following description, a scroll moving distance of a task window shall be described with reference to a scroll bar 1830.

FIG. 18(a) is a diagram for one example that a moving distance of a task window 1820 by being scrolled is d1. FIG. 18(b) is a diagram for one example that a moving distance of the task window 1820 by being scrolled is d2. Referring to FIG. 18(a), while a play window 1810 is located by being slanted in the top direction of the touchscreen, if the task window 1820 is scrolled to move in the top direction by d1, the controller 180 can control the play window 1810 to move by h1 in the bottom direction. Referring to FIG. 18(b), if the task window 1820 is scrolled to move by d2 (>d1), the controller 180 can control the play window 1810 to move by h2 (>h1) in the bottom direction. In particular, if the task window 1820 is scrolled in the same direction in which the play window 1810 is slanted, the controller 180 can control the moving distance of the play window 1810 to increase in proportion to the scroll moving distance of the task window 1820.

According to one embodiment of the present invention, only if a task window is scrolled to move to the end in the same direction in which a play window is slanted, the controller 180 can control a display location of the play window to be changed. This is described in detail with reference to FIG. 19 as follows.

Figure 19:
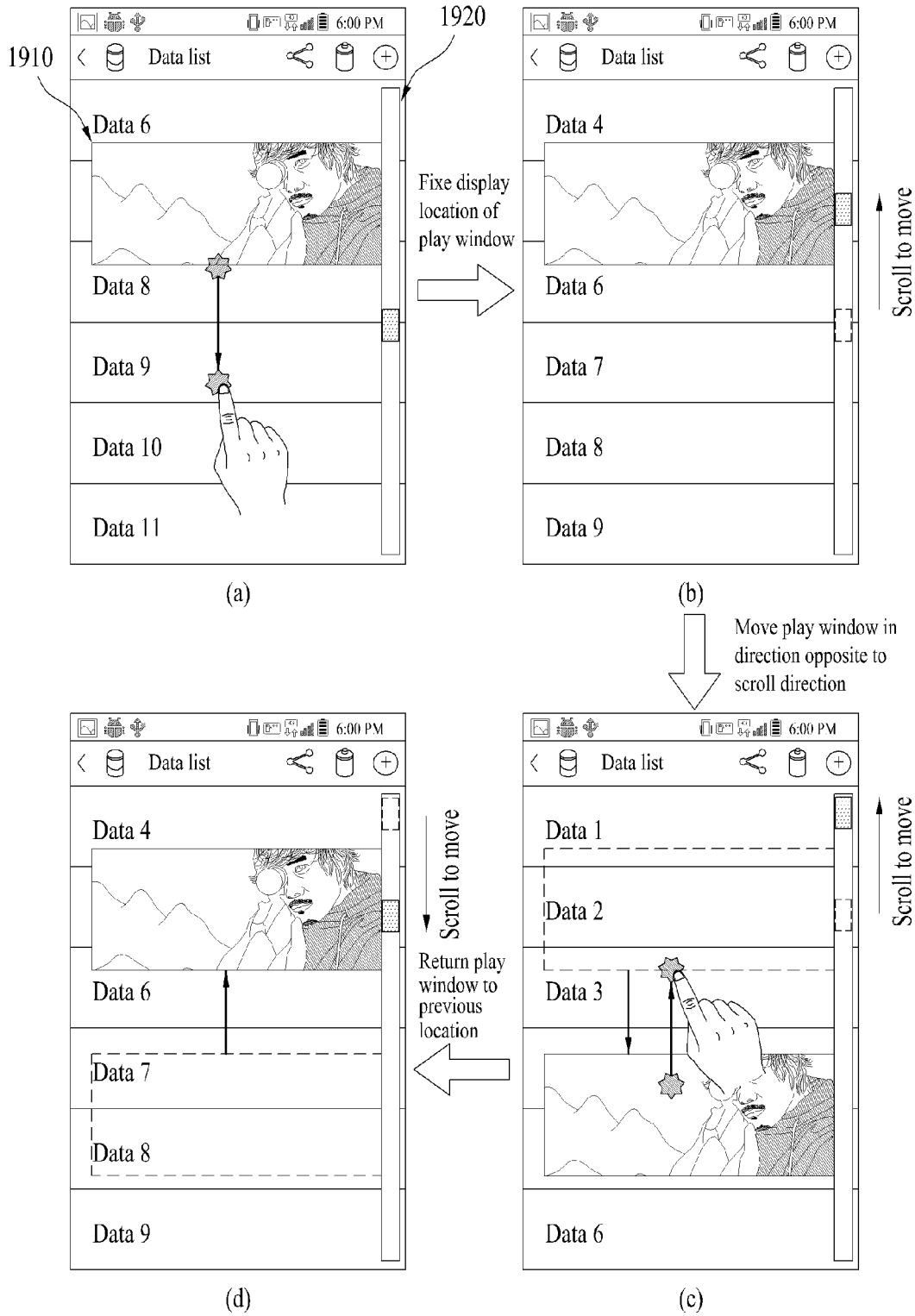
FIG. 19 is a diagram for one example to describe that a display location of a play window is changed if a task window is scrolled to an end in a direction equal to a play window slanted direction.

FIG. 19 is a diagram for one example to describe that a display location of a play window is changed if a task window is scrolled to an end in a direction equal to a play window slanted direction.

Referring to FIG. 19(*a*), when a play window 1910 is located by being slanted to a top side of the touchscreen, if a user input for scrolling a task window 1920 in the top direction is inputted, the controller 180 can control the task window 1920 to be scrolled to move in the top direction in response to the user input. In doing so, referring to FIG. 19(*b*), if the task window 1920 is not scrolled to move to a top (i.e., Data 1) of a data list, the controller 180 does not adjust a display location of the play window 1910. After the task window 1920 has scrolled to move to the top of the data list, referring to FIG. 19(*c*), the controller 180 can control the play window 1910 to move in the bottom direction.

After the play window 1910 has moved in the bottom direction, if a user input for scrolling the task window 1920 in the bottom direction is received, referring to FIG. 19(*d*), the controller 180 scrolls the task window 1920 in the bottom direction and is able to control the play window 1910 to a previous location.

Like the example shown in FIG. 19, if the task window 1920 is scrolled to move to the end in the same direction in which the play window 1910 is slanted, the controller 180 can move the play window 1910 in a direction opposite to the scroll direction. While the display location of the play window 1910 is changed, if the play window 1910 is scrolled to move in a direction opposite to the play window slanted direction, the controller 180 can control the play window 1910 to return to a previous location.

In the above drawings, an operation of changing a transparency of a play window is discriminated from an operation of changing a display location of a play window. Besides, it is possible to change the display location of the play window while changing the transparency of the play window.

According to some of the embodiments mentioned in the above descriptions, only if a play window slanted direction is equal to a scroll direction of a task window, a transparency of the play window can be increased or a location of the play window can be changed, for example. On the contrary, only if a play window slanted direction is opposite to a scroll direction of a task window, the controller 180 can increase a transparency of the play window or change a location of the play window.

Moreover, aside from a case of receiving a user input for scrolling a task window, the controller 180 can change at least one of a transparency and display location of a play window. Various cases of changing at least one of a transparency and display location of a play window are described in detail with reference to the accompanying drawing as follows.

Figure 20:
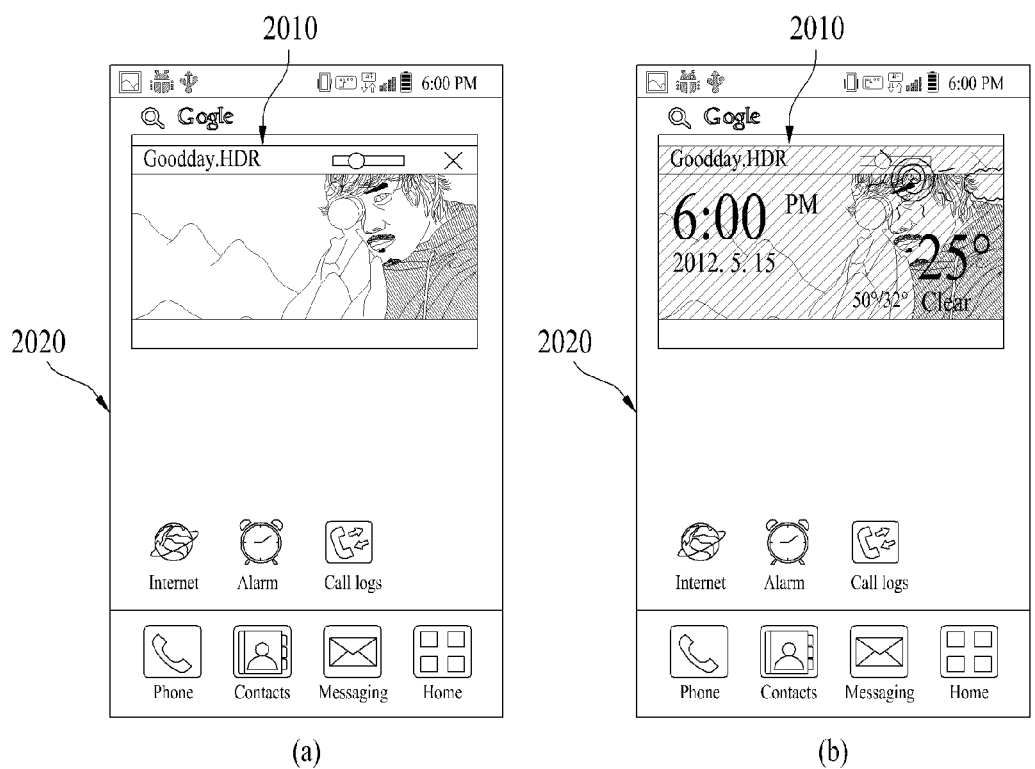
FIG. 20 is a diagram for one example to describe that a transparency of a play window is adjusted according to a priority in controlling the play window and a task window.

FIG. 20 is a diagram for one example to describe that a transparency of a play window is adjusted according to a priority in controlling the play window and a task window.

Referring to FIG. 20, a user can selectively manipulate one of a play window 2101 and a task window 2020. By determining that the user intends to which one of the play window 2101 and the task window 2020, the controller 180 can selectively give a control priority to either the play window 2010 or the task window 2020.

If the control priority is given to the play window 2010, a user's touch input can be understood as provided to manipulate the play window 2010. If the control priority is given to the task window 2020, a user's touch input can be understood as provided to manipulate the task window 2020.

In case that the control priority is given to the play window 2010, referring to FIG. 20(*a*), the controller 180 can control the play window 2010 to maintain a non-transparent state. On the contrary, if the control priority is given to the task window 2020, referring to FIG. 20(*b*), the controller 180 can control the play window 2010 to maintain a semi-transparent state.

In particular, like the example shown in FIG. 20, the controller 180 can adjust the transparency of the play window 2010 based on the control priority given to either the play window 2010 or the task window 2020.

FIG. 21 is a diagram for one example to describe an operation of a mobile terminal when a play window blocks an object displayed on a task window. For clarity of the following description, assume that an object blocked by a play window 2110 is a text input tool (e.g., IME (input method editor) 2130.

Referring to FIG. 21, if a play window 2110 blocks an object displayed on a task window 2120, the controller 180 can increase a transparency of the play window 2110 or change a display location of the play window 2110. For instance, if a user takes an action of attempting to input a text through the task window 2120 (e.g., a touch to a text application, etc.), the controller 180 enters a text input mode and is able to control a text input tool 2130 to be displayed [FIG. 21(*a*)]. In doing so, if the play window 2110 blocks the text input tool 2130, the controller 180 can control a transparency of the play window 2110 to increase [FIG. 21(*a*)]. For another instance, the controller 180 can adjust a display location of the play window 2210 not to block the text input tool 2130 [FIG. 21(*b*)].

In particular, like the example shown in FIG. 21, if the play window 2110 blocks an object displayed on the task window 2120, the transparency of the play window 2110 can be increased or the display location of the play window 2110 can be changed. In the example shown in FIG. 21, the object displayed on the task window 2120 includes the text input tool 2130. Various items including an icon, a popup message, a toast message and the like can belong to a scope of the object displayed on the task window 2120 as well as the text input tool 2130. Moreover, the controller 180 sets a state of the play window 2110 to a semitransparent state for a prescribed time only and can control the play window 2110 to return to a non-transparent state after expiration of the prescribed time.

According to the present invention, the controller 180 can control the transparency of the play window to increase if an event occurs through the task window. As mentioned in the above description, the controller 180 sets a state of the play window to a semitransparent state for a prescribed time only and can control the play window to return to a non-transparent state after expiration of the prescribed time.

And, it is able to skip at least one of the operation of the mobile terminal 100 in case of the event occurrence [S404, S405] in the task window shown in FIG. 4 and the operation of the mobile terminal 100 in case of the reception [S406, S407] of the user input for scrolling the task window. Moreover, in FIG. 4, while the video is outputted [S401], the user input for multitasking is received [S402]. Yet, after the user input for the multitasking has been received, it is able to set a video to be played as one of multitasks.

Accordingly, embodiments of the present invention provide various effects and/or features.

First of all, the present invention provides a mobile terminal and controlling method thereof, thereby enhancing user's convenience.

In particular, when a task window is blocked due to a play window in a multitasking environment, the present invention provides a mobile terminal and controlling method thereof, thereby securing visibility of the blocked region.

Moreover, in case that a level of user's concentration on a video is lowered in a multitasking environment, the present invention provides a mobile terminal and controlling method thereof, thereby restoring a video play timing point into a user's concentration lowered timing point.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display unit; and
   a processor configured to:
   play a video in a play window on the display unit;
   in response to reception of a first command for multitasking while the video is played, display a task window for processing an additional task on the display unit, wherein the play window is overlaid on the task window; and
   in response to reception of a second command for scrolling the task window, scroll the task window and automatically adjust a transparency of the play window,
   wherein if an event occurs through the task window at a first timing point, the processor sets a bookmark to a play timing point of the video corresponding to the first timing point,
   wherein if a third command for selecting the bookmark is received, the processor plays the video from the play timing point indicated by the bookmark, and
   wherein if an event occurs through the task window, the processor either pauses a play of the video or records the video.

2. The mobile terminal of claim 1, wherein when the play window is slanted in a first direction of the display unit, if the task window is scrolled in the first direction, the processor controls the transparency of the play window to be increased.

3. The mobile terminal of claim 2, wherein the processor adjusts a transparency increase level of the play window in proportion to a scroll distance of the task window.

4. The mobile terminal of claim 2, wherein when the play window is slanted in the first direction of the display unit, if the task window is scrolled in a second direction opposite to the first direction, the processor controls the transparency of the play window to be maintained or decreased.

5. The mobile terminal of claim 1, wherein when the play window is slanted in a first direction of the display unit, if the task window is scrolled to an end portion of the first direction, the processor controls the transparency of the play window to be increased.

6. The mobile terminal of claim 5, wherein after the transparency of the play window is increased as the task window is scrolled to the end portion of the first direction, if a fourth command for scrolling the task window in a second direction opposite to the first direction is received, the processor controls the transparency of the play window to return to a previous transparency.

7. The mobile terminal of claim 1, wherein when the play window is slanted in a first direction of the display unit, if the task window is scrolled to move in the first direction, the processor controls a display location of the play window to move along a second direction opposite to the first direction.

8. The mobile terminal of claim 7, wherein the processor adjusts a moving extent of the display location of the play window in proportion to a scroll moving distance of the task window.

9. The mobile terminal of claim 7, wherein when the play window is slanted in the first direction of the display unit, if the task window is scrolled to move in the second direction opposite to the first direction, the processor fixes the display location of the play window.

10. The mobile terminal of claim 1, wherein if the play window blocks an object displayed on the task window, the processor controls the transparency of the play window to be increased.

11. The mobile terminal of claim 1, wherein if a control priority is given not to the play window but to the task window, the processor controls the transparency of the play window to be increased.

12. The mobile terminal of claim 1, wherein the controller displays a graphic object for displaying the bookmark on the play window and attaches a label for identifying a type of the event to the graphic object.

13. A method of controlling a mobile terminal, the method comprising:
   playing a video in a play window on a display unit of the mobile terminal;
   in response to reception of a first command for multitasking while the video is played, displaying a task window for processing an additional task on the display unit, wherein the play window is overlaid on the task window; and
   in response to reception of a second command for scrolling the task window, scrolling the task window and automatically adjusting a transparency of the play window,
   wherein if an event occurs through the task window at a first timing point, setting a bookmark to a play timing point of the video corresponding to the first timing point,
   wherein if a third command for selecting the bookmark is received, playing the video from the play timing point indicated by the bookmark, and
   wherein if an event occurs through the task window, pausing a play of the video or recording the video.

14. The mobile terminal of claim 1, wherein the display unit is a touch screen and the second command is to touch-drag the touch screen, and wherein the processor is further configured to:
in response to release of a pointer for touch-dragging from the touch screen, control the transparency of the play window to return to a previous transparency.

15. The mobile terminal of claim 14, wherein the processor is configured to:
display the play window semi-transparently only if the pointer for touch-dragging is maintained on the touch screen.

16. The mobile terminal of claim 1, wherein the processor is configured to:
determine whether to adjust the transparency of the play window based on both a direction in which the task window is scroll and a display location of the play window.

* * * * *